(12) United States Patent
Sasaki et al.

(10) Patent No.: US 7,463,450 B2
(45) Date of Patent: Dec. 9, 2008

(54) THIN FILM MAGNETIC HEAD

(75) Inventors: Yoshitaka Sasaki, Milpitas, CA (US);
Hiroyuki Itoh, Milpitas, CA (US);
Takehiro Kamigama, Hong Kong (CN);
Tatsushi Shimizu, Hong Kong (CN)

(73) Assignees: Headweay Technologies, Inc., Milpitas, CA (US); Sae Magnetics (H.K.) Ltd., Shatin, N.T. (HK)

( * ) Notice: Subject to any disclaimer, the term of this patent is extended or adjusted under 35 U.S.C. 154(b) by 451 days.

(21) Appl. No.: 11/134,477

(22) Filed: May 23, 2005

(65) Prior Publication Data
US 2006/0262440 A1  Nov. 23, 2006

(51) Int. Cl.
*G11B 5/31* (2006.01)
*G11B 5/147* (2006.01)

(52) U.S. Cl. ............... 360/125.24; 360/125.3; 360/125.72

(58) Field of Classification Search ............ 360/125.03, 360/125.04, 125.12, 125.22, 125.23, 125.24, 360/125.72
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 6,631,054 B2* | 10/2003 | Miyazaki et al. | 360/317 |
| 6,791,793 B1* | 9/2004 | Chen et al. | 360/125.12 |
| 2001/0017751 A1* | 8/2001 | Miyazaki et al. | 360/317 |
| 2002/0080525 A1* | 6/2002 | Sato et al. | 360/126 |
| 2003/0189787 A1* | 10/2003 | Matono et al. | 360/126 |
| 2004/0150912 A1* | 8/2004 | Kawato et al. | 360/126 |
| 2004/0264048 A1* | 12/2004 | Matono et al. | 360/126 |
| 2005/0007696 A1* | 1/2005 | Chen et al. | 360/126 |
| 2005/0013044 A1* | 1/2005 | Hirata et al. | 360/125 |
| 2005/0068675 A1 | 3/2005 | Sasaki et al. | |
| 2005/0083607 A1 | 4/2005 | Sasaki et al. | |
| 2005/0128639 A1 | 6/2005 | Sasaki et al. | |
| 2005/0157423 A1 | 7/2005 | Sasaki et al. | |
| 2005/0185337 A1 | 8/2005 | Sasaki et al. | |

(Continued)

FOREIGN PATENT DOCUMENTS

JP  2003-203311  7/2003

(Continued)

*Primary Examiner*—Brian E Miller
(74) *Attorney, Agent, or Firm*—Oblon, Spivak, McClelland, Maier & Neustadt, P.C.

(57) ABSTRACT

A thin film magnetic head has a configuration in which a main magnetic pole film having a magnetic pole end portion on a medium opposing surface (ABS) side facing a magnetic disk, a write shield film facing the magnetic pole end portion so as to form a recording gap film on the medium opposing surface side, and a thin film coil wound around at least a part of the write shield film are laminated. Further, the thin film magnetic head has an upper yoke magnetic pole film whose size is larger than that of the main magnetic pole film at a part more distant from the ABS than the recording gap film, and this upper yoke magnetic pole film is bonded to the side of the main magnetic pole film close to the thin film coil. In the upper yoke magnetic pole film, an end portion on the ABS side is retracted in a direction apart from the ABS in accordance with an increase in film thickness which is measured from the surface of the main magnetic pole film.

14 Claims, 34 Drawing Sheets

U.S. PATENT DOCUMENTS

| | | | |
|---|---|---|---|
| 2005/0259357 A1* | 11/2005 | Kameda | 360/126 |
| 2005/0280938 A1* | 12/2005 | Sasaki et al. | 360/126 |
| 2006/0103980 A1* | 5/2006 | Sasaki et al. | 360/126 |
| 2006/0139801 A1* | 6/2006 | Kamada | 360/125 |
| 2007/0030602 A1* | 2/2007 | Matono | 360/317 |

FOREIGN PATENT DOCUMENTS

| | | |
|---|---|---|
| JP | 2003-242607 | 8/2003 |
| JP | 2004-94997 | 3/2004 |

* cited by examiner

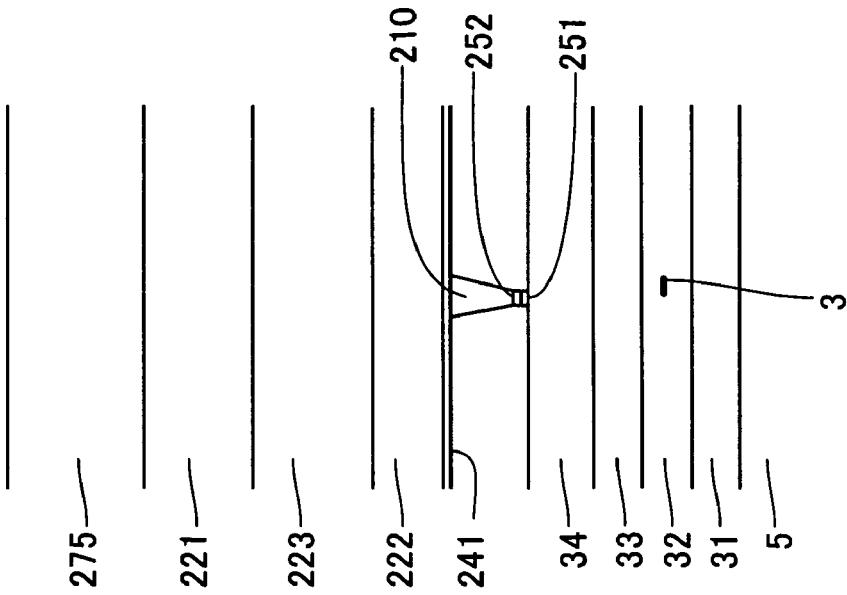
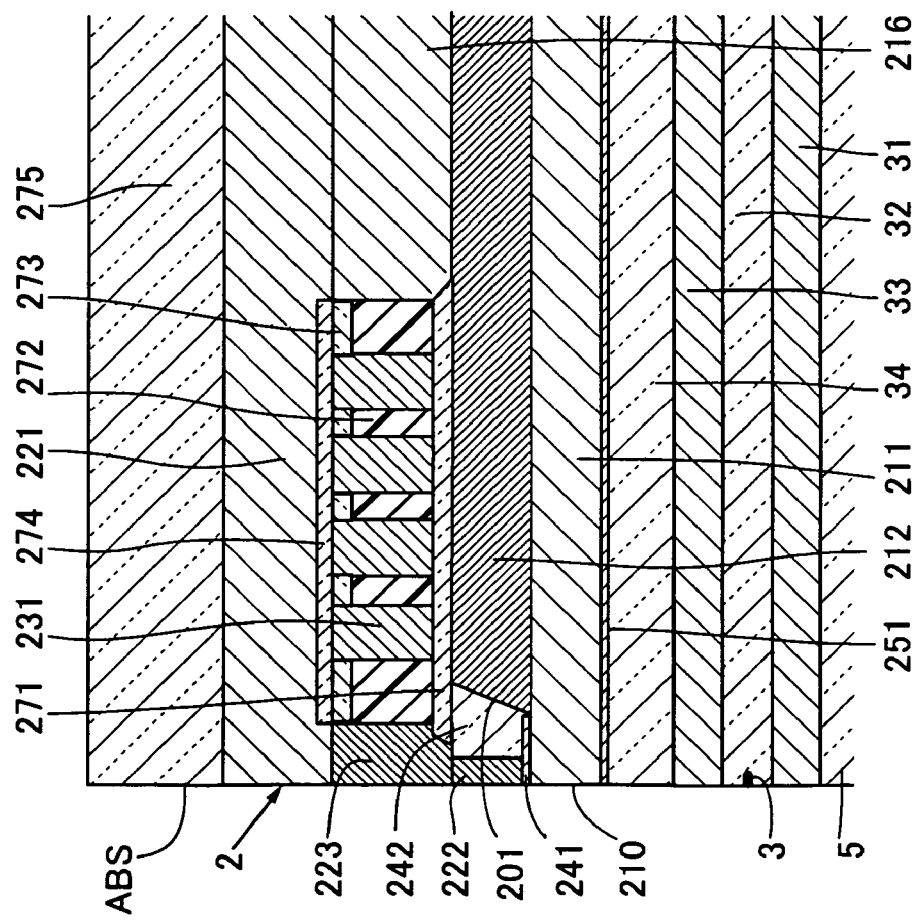

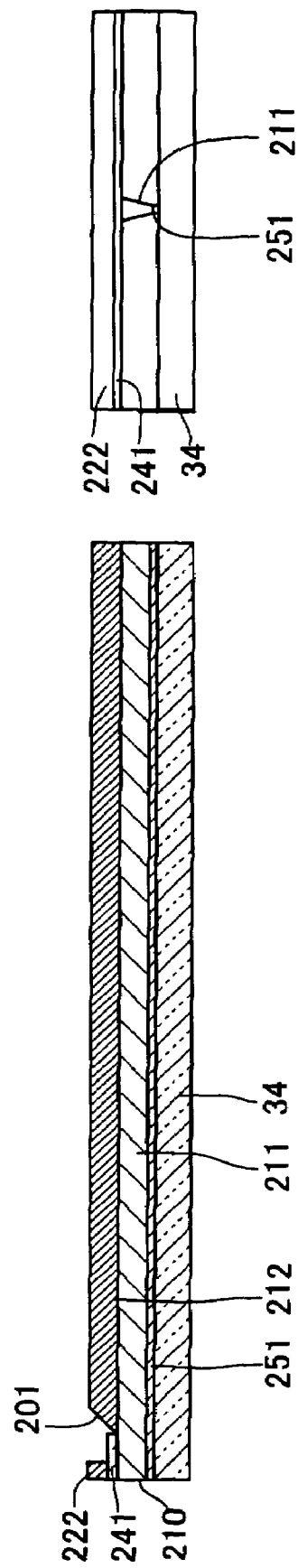

THIN FILM MAGNETIC HEAD

BACKGROUND OF THE INVENTION

1. Field of the Invention

The present invention relates to a thin film magnetic head which performs a magnetic recording operation in a perpendicular recording scheme and a manufacturing method thereof, and to a magnetic head apparatus and a magnetic disk apparatus.

2. Description of the Related Art

In recent years, the surface recording density of a magnetic disk apparatus has been considerably improved. In particular, the surface recording density of a magnetic disk apparatus has recently reached 160 to 200 giga bytes/platter and will further robustly exceeds this value. With this increase, an improvement in performance of a thin film magnetic head has been demanded.

Roughly classifying the thin film magnetic head based on recording schemes, there are a longitudinal recording scheme which records information in an in-recording-surface (longitudinal) direction of a magnetic disk and a perpendicular recording scheme which records information in a vertical direction of a recording surface. Of these schemes, a thin film magnetic head based on the vertical recoding scheme can realize the recording density which is greatly higher than that of the longitudinal recording scheme, and a magnetic disk recorded by the thin film magnetic head is hardly affected by heat wobbles. Therefore, the perpendicular recording scheme is expected as compared with the longitudinal recording scheme. A thin film magnetic head based on the conventional perpendicular recording scheme is disclosed in specifications of, e.g., U.S. Pat. No. 6,504,675, U.S. Pat. No. 4,656,546, U.S. Pat. No. 4,672,493, Japanese Patent Application Laid-open No. 2004-94997 and others.

Meanwhile, when recording data in an area at an inner periphery or an outer periphery of a magnetic disk, by using a thin film magnetic head based on the perpendicular recording scheme, a magnetic pole end portion arranged at the side of a medium opposing surface (which will be also referred to as an air bearing surface or ABS) facing the magnetic disk inclines at a given angle (Skew Angle) with respect to a track on which data is recorded.

If the write capability is high in a magnetic head based on the perpendicular recording scheme (a perpendicular magnetic recording head: which will be referred to as a "PMR" hereinafter), there may occur a problem which is a so-called write blur by which unnecessary data is recorded between adjacent tracks due to generation of this skew angle. When this write blur is produced, detection of a servo signal or an S/N ratio of a reproduction waveform is adversely affected. Thus, in a conventional PMR, a magnetic pole end portion on the ABS side in a main magnetic pole film has a bevel shape whose width is gradually narrowed along one direction (see Japanese Patent Application Laid-open No. 2003-242607 and Japanese Patent Application Laid-open No. 2003-203311).

As the PMR having the magnetic pole end portion formed into a bevel shape, there is known one comprising a lower yoke film, a main magnetic pole film having a bevel-shaped magnetic pole end portion, and a write shield layer facing the main magnetic pole film with a recording gap film sandwiched therebetween on the ABS side. In this type of PMR, one having a narrower track width is demanded in order to improve the recording density. Further, it is desirable to provide the excellent overwrite characteristics and prevent data from being overwritten on another data recorded on a magnetic disk. Accordingly, providing a configuration in which the lower yoke film is arranged close to the ABS is desirable.

In this type of PMR, however, since the main magnetic pole film is formed after the lower yoke film, the lower yoke film is affected and a neck height appears when forming the main magnetic pole film with the magnetic pole end portion having a bevel shape, and a part having a narrow width corresponding to a track width is extended by a length corresponding to the neck height part, resulting in the possibility of shifting from a designed length.

In order to avoid the influence by shifting of this neck height, the lower yoke film must be formed apart from the ABS, and it is difficult to increase a magnetic charge (which is also referred to as a magnetic volume) at a part close to the ABS. Therefore, the conventional PMR has a problem that providing the excellent overwrite characteristics is difficult.

SUMMARY OF THE INVENTION

It is an object of the present invention to provide a perpendicular recording type thin film magnetic head having a configuration which can provide the excellent overwrite characteristics and a manufacturing method thereof, a magnetic head apparatus and a magnetic disk apparatus.

To achieve this aim, a thin film magnetic head according to the present invention comprises a main magnetic pole film, a write shield film, an upper yoke magnetic pole film and a thin film coil. The main magnetic pole film has a magnetic pole end portion on a medium opposing surface (ABS) side which should face a magnetic disk. The write shield film faces the magnetic pole end portion so as to form a recording gap film on the ABS side. The upper yoke magnetic pole film is connected to the side of the main magnetic pole film close to the write shield film, and the end portion of the ABS side is retracted in a direction apart from the ABS in accordance with an increase in film thickness with the main magnetic pole film being determined as a reference. The thin film coil supplies a magnetic flux passing through the main magnetic pole film, the write shield film and the upper yoke magnetic pole film.

As described above, in the thin film magnetic head according to the present invention, the upper yoke magnetic pole film is connected to the side of the main magnetic pole film close to the write shield film. That is, the yoke magnetic pole film is connected to the upper side of the main magnetic pole film, and it is different from the conventional configuration in which the yoke magnetic pole film is connected to the lower side of the main magnetic pole film distanced from the write shield film. According to the above-described configuration, in the thin film magnetic head, the upper yoke magnetic pole film having a large magnetic charge can be arranged in the vicinity of the ABS, thereby increasing the magnetic charge in the vicinity of the ABS. Therefore, the thin film magnetic head with the excellent overwrite characteristics can be obtained.

Another important point of the present invention lies in that the end portion on the ABS side in the upper yoke magnetic pole film is retracted in a direction apart from the ABS in accordance with an increase in film thickness which is measured from the surface of the main magnetic pole film. According to this configuration, since an interval between the end portion of the upper yoke magnetic pole film and the write shield film is increased as distanced from the ABS, the shield end portion of the write shield film facing the magnetic pole end of the main magnetic pole can be prevented from generating the magnetic saturation due to a magnetic flux leaking from the end portion of the upper yoke magnetic pole film.

Further, since the shield end portion of the write shield film facing the magnetic pole end of the main magnetic pole film can be prevented from generating the magnetic saturation, the end portion of the upper yoke magnetic pole film can be arranged closer to the ABS, thereby further improving the overwrite characteristics.

In the upper yoke magnetic pole film, in an example of a specific configuration in which the end portion on the ABS side is retracted in a direction apart from the ABS in accordance with an increase in film thickness which is measured from the surface of the main magnetic pole film, the end portion of the upper yoke magnetic pole film has an inclined surface. This configuration can be applied to an example where the upper yoke magnetic pole film comprises one layer only as well as an example where the upper yoke magnetic pole film comprises a plurality of layers.

When the upper yoke magnetic pole film comprises a plurality of layers, the end portion of the upper yoke magnetic film of each layer can be sequentially retracted in a direction apart from the ABS.

Further, it is good enough for the thin film magnetic head to have a configuration in which the main magnetic pole film and the upper yoke magnetic pole film are respectively formed of magnetic materials having different saturation magnetic flux densities and the saturation magnetic flux density of the upper yoke magnetic pole film is set higher than the saturation magnetic flux density of the main magnetic pole film. With such a configuration, the saturation magnetic flux density of the magnetic pole end portion can be set high, and saturation of the magnetic flux can be hardly generated even if a track width in the magnetic pole end portion is narrowed.

Furthermore, it is preferable to further have a high-tension film comprising Ta, W, Mo, TiW, TiN, Cr, NiCr, Mo, Ru, SiN or the like in contact with the main magnetic pole film. This high-tension film can maintain a direction of residual magnetization of the main magnetic pole film after termination of a write operation in a direction along the ABS. Moreover, it is preferable that the shield end portion and the main magnetic pole film are formed of magnetic materials having different saturation magnetic flux densities and the saturation magnetic flux density of the shield end portion is set lower than the saturation magnetic flux density of the main magnetic pole film.

The present invention further discloses a magnetic head apparatus using the above-described thin film magnetic head, a magnetic disk apparatus, and a thin film magnetic head manufacturing method.

The present invention will be more fully understood from the detailed description given here in below and the accompanying drawings which are given by way of illustration only, and thus are not to be considered as limiting the present invention.

BRIEF DESCRIPTION OF THE DRAWINGS

FIG. 3A is a cross-sectional view showing an element part of the thin film magnetic head depicted in FIGS. 1 and 2 in an enlarging manner;

FIG. 3B is a front view showing FIG. 3A from an ABS side;

FIG. 28A is a cross-sectional view showing a step after the step depicted in FIGS. 27A and 27B;

FIG. 28B is a front view showing the state depicted in FIG. 28A from the ABS side;

DESCRIPTION OF PREFERRED EMBODIMENT

1. Thin Film Magnetic Head

<Embodiment 1 of Thin Film Magnetic Head>

Figure 1:
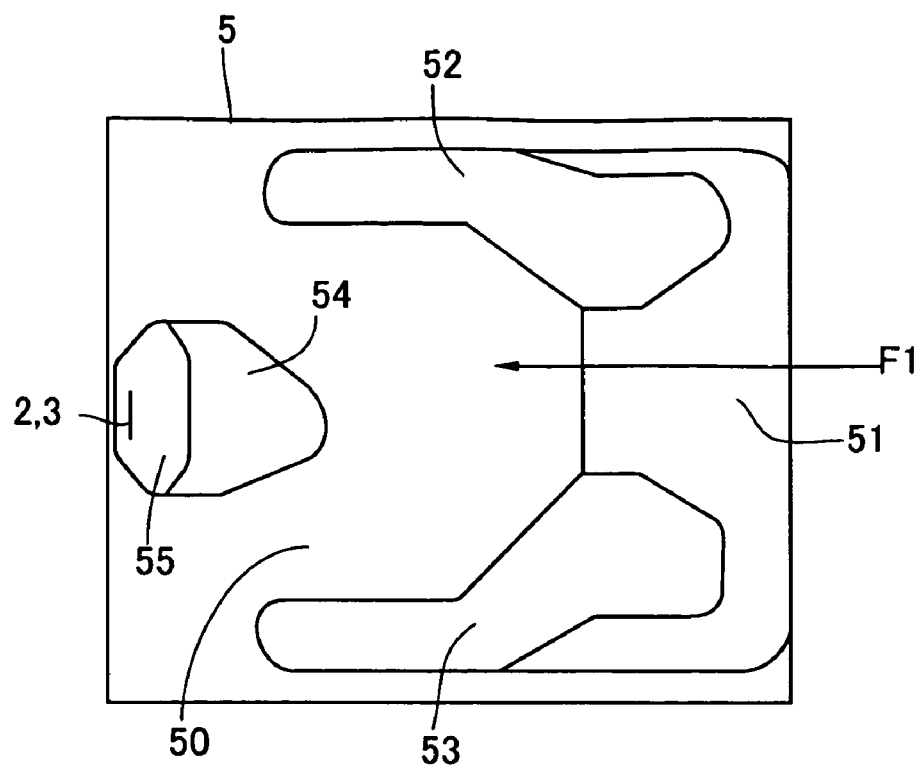
FIG. 1 is a bottom view of a thin film magnetic head according to the present invention.
Figure 2:
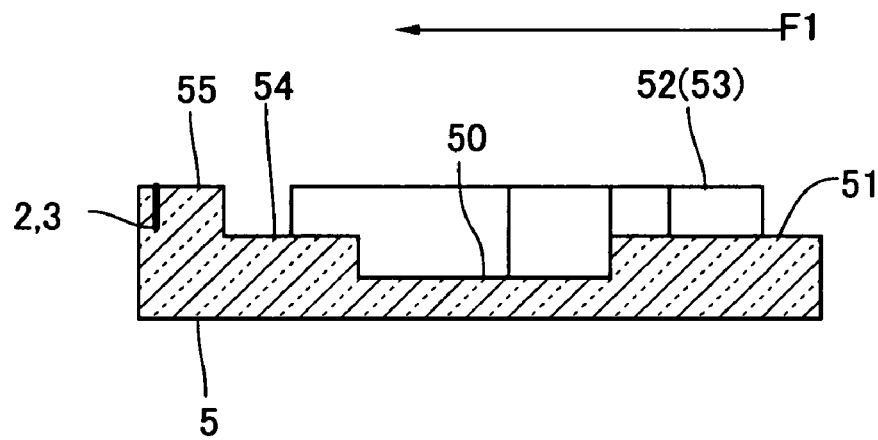
FIG. 2 is a cross-sectional view of the thin film magnetic head depicted in FIG. 1.
Figure 4:
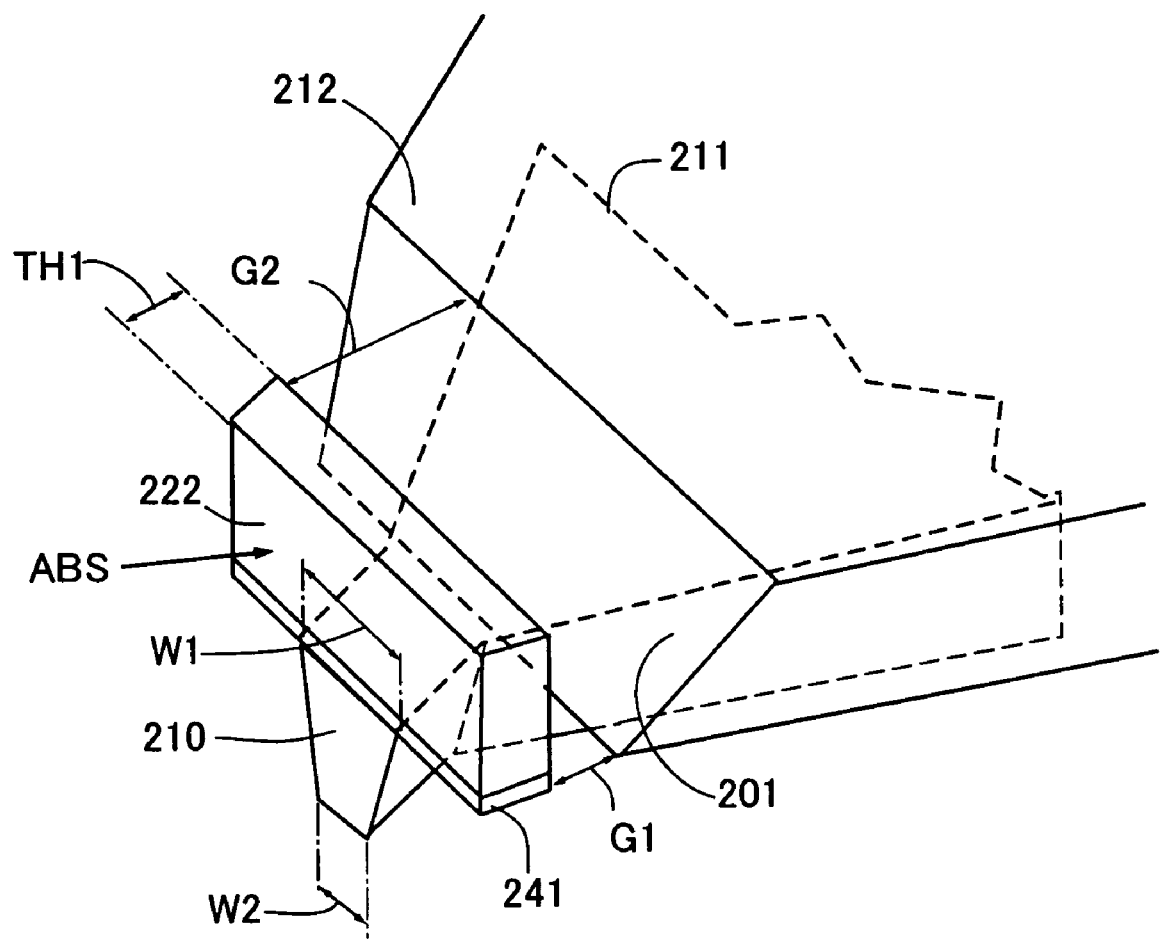
FIG. 4 is a perspective view showing a configuration of the element part depicted in FIGS. 3A and B in an enlarging manner.

Referring to FIGS. 1 and 2, a thin film magnetic head according to the present invention includes a slider 5, a recording head 2 and a read element 3. The slider 5 is a ceramic structure consisting of, e.g., $Al_2O_3$—TiC or the like. The slider 5 has a geometrical shape for controlling the flying characteristics in an ABS. As a typical example of such a geometrical shape, the drawing shows an example comprising a first step portion 51, a second step portion 52, a third step portion 53, a fourth step portion 54 and a fifth step portion 55 on a base bottom surface 50 on the ABS side. The base bottom surface 50 serves as a negative pressure generating section with respect to a direction of an air flow indicated by an arrow F1, and the second step portion 52 and the third step portion 53 constitute a stepped air bearing rising from the first step portion 51. The surfaces of the second step portion 52 and the third step portion 53 function as the ABS. The fourth step portion 54 rises in the stepped form from the base bottom surface 50, and the fifth step portion 55 rises in the stepped form from the fourth step portion 54. Electromagnetic conversion elements 2 and 3 are provided to the fifth step portion 55.

The electromagnetic conversion elements 2 and 3 include a recording head 2 and a read element 3. The recording head 2 and the read element 3 are provided on an air discharge end (a trailing edge) side as seen from an air flow direction F1.

Next, referring to FIGS. 3A and 3B, a first shield film 31, an insulating film 32, a second shield film 33 and an insulating film 34 are sequentially formed on an end surface of the slider 5, and the read element 3 is formed in the insulating film 32. The read element 3 can be constituted of a GMR (Giant Magnetoresistive) element or a ferromagnetic tunnel junction element.

The recording head 2 is a perpendicular recording element which records data by magnetizing a magnetic recording layer of a magnetic disk in a direction perpendicular to a recording surface of the magnetic disk. The recording head 2 has a main magnetic pole film 211, an upper yoke magnetic pole film 212, a write shield film 221, a recording gap film 241 and a thin film coil 231 as well as a back gap portion 216. The expressions "upper" and "lower" are used only when making reference to the drawings, and the upper and lower relationship may be inverted.

FIGS. 4 to 6A shows a configuration and a relative relationship of the main magnetic pole film 211, the upper yoke magnetic pole film 212, the write shield film 221 and the recording gap film 241. Referring to these drawings, the main magnetic pole film 211 has a magnetic pole end portion 210 on the ABS side. Although the main magnetic pole film 211 has a narrow track width configuration in which a lateral width W1 in the magnetic pole end portion 210 is narrowed in order to increase the recording density of data, a magnetic material (an Hi-Bs material) having the saturation magnetic flux density higher than that of the upper yoke magnetic pole film 212 is used in order to avoid occurrence of saturation of a magnetic flux even in the narrow track width configuration.

The magnetic pole end portion 210 is arranged on the ABS side and has a track width restricting portion having a fixed width which restricts a track width. In the magnetic pole end portion 210, a lateral width close to the thin film coil 231 is W1 whilst a lateral width apart from the thin film coil 231 is W2, and the magnetic pole end portion has a bevel shape in which the lateral width is gradually narrowed as distanced from the thin film coil 231. That is, (W1>W2) is achieved, and the lateral width W1 serves as a track width. Further, a depth (a distance from the ABS) of the magnetic pole end portion 210 corresponds to a throat height TH1.

Figure 6A:
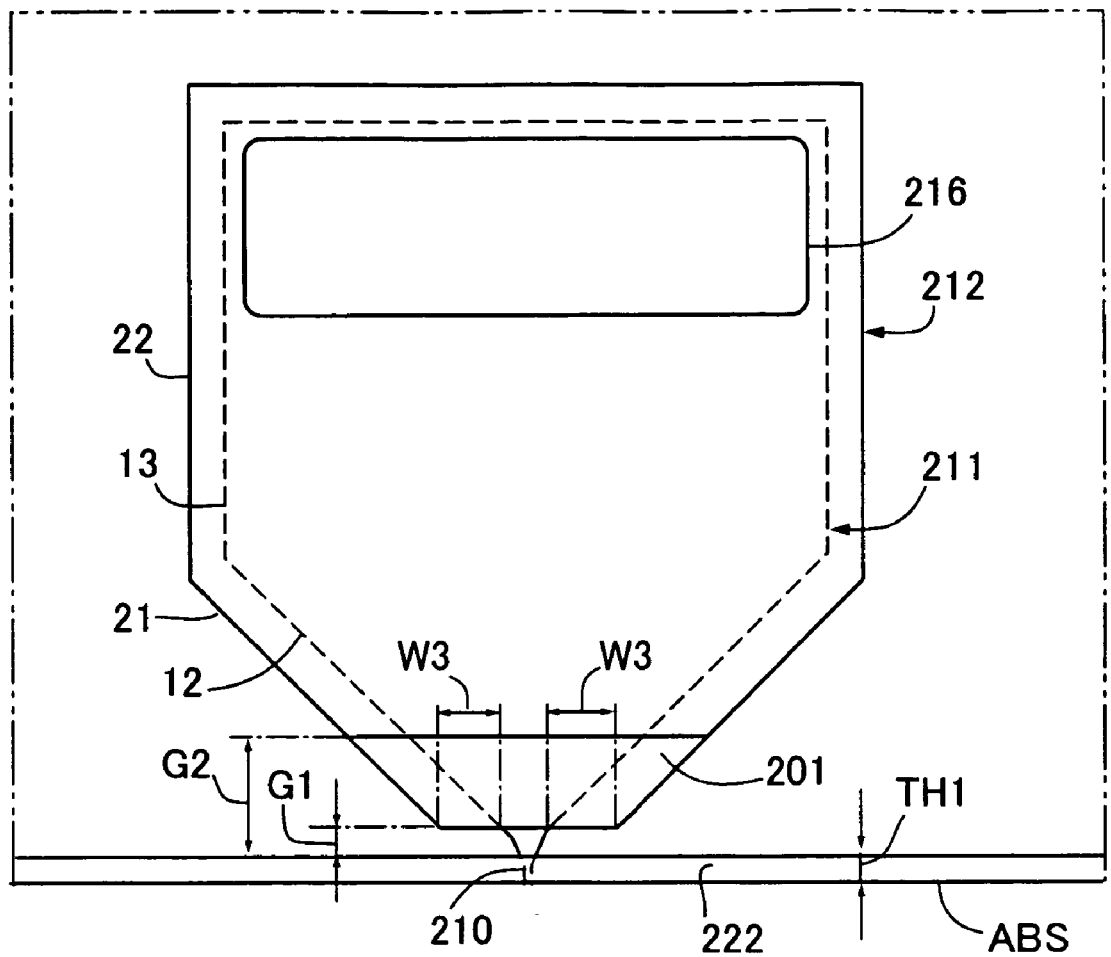
FIG. 6A is a plan view showing a relationship between an upper yoke magnetic film and a shield end portion of a write shield film with respect to the configuration of the element part depicted in FIGS. 3A and B.

In the main magnetic pole film 211, a yoke portion continuous with a rear part of the magnetic pole end portion 210 is, as shown in FIG. 6A, arranged at a position more distant from the ABS than the recording gap film 241 and the magnetic pole end portion 210. This yoke portion has a variable width area 12 in which a width is gradually increased as distanced from the ABS and a fixed width area 13 having a fixed width.

In the yoke portion of the main magnetic pole film 211, the upper yoke magnetic pole film 212 is connected to the surface close to the thin film coil 231. Referring to FIG. 6A, the upper yoke magnetic pole film 212 is arranged at a position apart from the ABS, has a variable width area 21 in which a lateral width is gradually increased as distanced from the ABS and a fixed width area 22 having a fixed lateral width, and entirely has a superficial content larger than the size of the yoke portion of the main magnetic pole film 211. In the upper yoke magnetic pole film 212, an end edge which is in contact with the main magnetic pole film 211 protrudes in the lateral direction by an amount corresponding to a width W3.

The upper yoke magnetic pole film 212 is connected to the surface of the yoke portion close to the thin film coil 231 in such a manner that the yoke portion of the main magnetic pole film 211 is accommodated inside. That is, the upper yoke magnetic pole film 212 is connected to the yoke portion in such a manner that a peripheral part thereof is arranged outside the yoke portion of the main magnetic pole film 211. Further, the write shield film 221 is magnetically coupled with the upper yoke magnetic pole film 212 at a part distanced from the ABS, and the upper yoke magnetic pole film 212 and the write shield film 221 form a coupling portion 216. The recording gap film 241 is formed between the main magnetic pole film 211 and a first write shield portion 222 of the write shield film 221.

Again referring to FIGS. 3A and 3B, the write shield film 221 has a first write shield portion 222 and a second write shield portion 223. The first write shield portion 222 faces the magnetic pole end portion 210 of the main magnetic pole film 211 with the recording gap film 241 therebetween in the ABS, and is formed so that the throat height TH1 is determined based on the depth in a direction crossing the ABS. Further, the first write shield portion 222 has an end surface formed to have the same height as that of the end surface of the upper yoke magnetic pole film 212 on the side close to the thin film coil 231, and the second write shield portion 223 is connected with this end surface.

The thin film coil 231 is wound around the upper yoke magnetic pole film 212 and the write shield film 221 in the insulated state through insulating films 271, 272 and 273. The thin film coil 231 can take either a planar spiral form or a helical form.

As described above, in the thin film magnetic head according to the present invention, the upper yoke magnetic pole film 212 is connected to the surface of the main magnetic pole film 211 on the side close to the thin film coil 231, and is formed after the main magnetic pole film 211. Therefore, the magnetic pole end portion 210 is formed before the upper yoke magnetic pole film 212, the upper yoke magnetic pole film 212 is not affected by a step of forming the magnetic pole end portion 210 and the shape thereof is not changed. Accordingly, a length of a small-width part having a track width is determined by the magnetic pole end portion 210, and the length can be set as expected without deviating from a design length. Thus, the upper yoke magnetic pole film 212 can be arranged closer to the ABS.

Moreover, the size of the upper yoke magnetic pole film 212 is larger than that of the yoke portion of the main magnetic pole film 211, and a magnetic volume of the upper yoke magnetic pole film 212 is large. Therefore, the upper yoke magnetic pole film 212 having a large magnetic charge can be arranged in the vicinity of the ABS, and a magnetic charge in the vicinity of the ABS can be increased. Therefore, the overwrite characteristics can be improved.

Additionally, the upper yoke magnetic pole film 212 and the first write shield portion 222 are provided, and the first write shield portion 222 is arranged so as to face the magnetic pole end portion 210 with the recording gap film 241 therebetween in the ABS. This first write shield portion 222 enables absorption of a returning magnetic flux from the magnetic disk, thereby avoiding leakage of the excessive magnetism. As a result, the excellent overwrite characteristics can be maintained even when the upper yoke magnetic pole film 212 is arranged close to the ABS, and ATE can be avoided.

In the illustrated thin film magnetic head, as another important configuration, the end portion of the upper yoke magnetic pole film 212 on the ABS side is retracted in a direction apart from the ABS in accordance with an increase in film thickness which is measured from the surface of the main magnetic pole film 211. Specifically, the end portion of the upper yoke magnetic pole film 212 has an inclined surface 201. According to this configuration, since a distance between the end portion of the upper yoke magnetic pole film 212 and the first write shield portion 222 as a part of the write shield film 211 is increased from a gap G1 to a gap G2 as distanced from the ABS, the first write shield portion 222 of the write shield film 211 can be prevented from generating magnetic saturation due to a magnetic flux leaking from the end portion of the upper yoke magnetic pole film 212.

Additionally, since the write shield portion 222 facing the magnetic pole end 210 of the main magnetic pole film 211 can be prevented from generating magnetic saturation, the end portion of the upper yoke magnetic pole film 212 can be arranged closer to the ABS, thereby further improving the overwrite characteristics.

The lower edge of the upper yoke magnetic pole film 212 which is in contact with the main magnetic pole film 211 is set to be closest to the first write shield portion 222 while maintaining the gap G1. The upper edge of the upper yoke magnetic pole film 212 maintains the gap G2 larger than the gap G1 with respect to the first write shield portion 222. In the embodiment, the upper yoke magnetic pole film 212 is a single layer film, and the inclined surface 201 is provided at the end portion thereof. The gaps G1 and G2 are filled with an inorganic insulating film 242 formed of alumina or the like.

Figure 5:
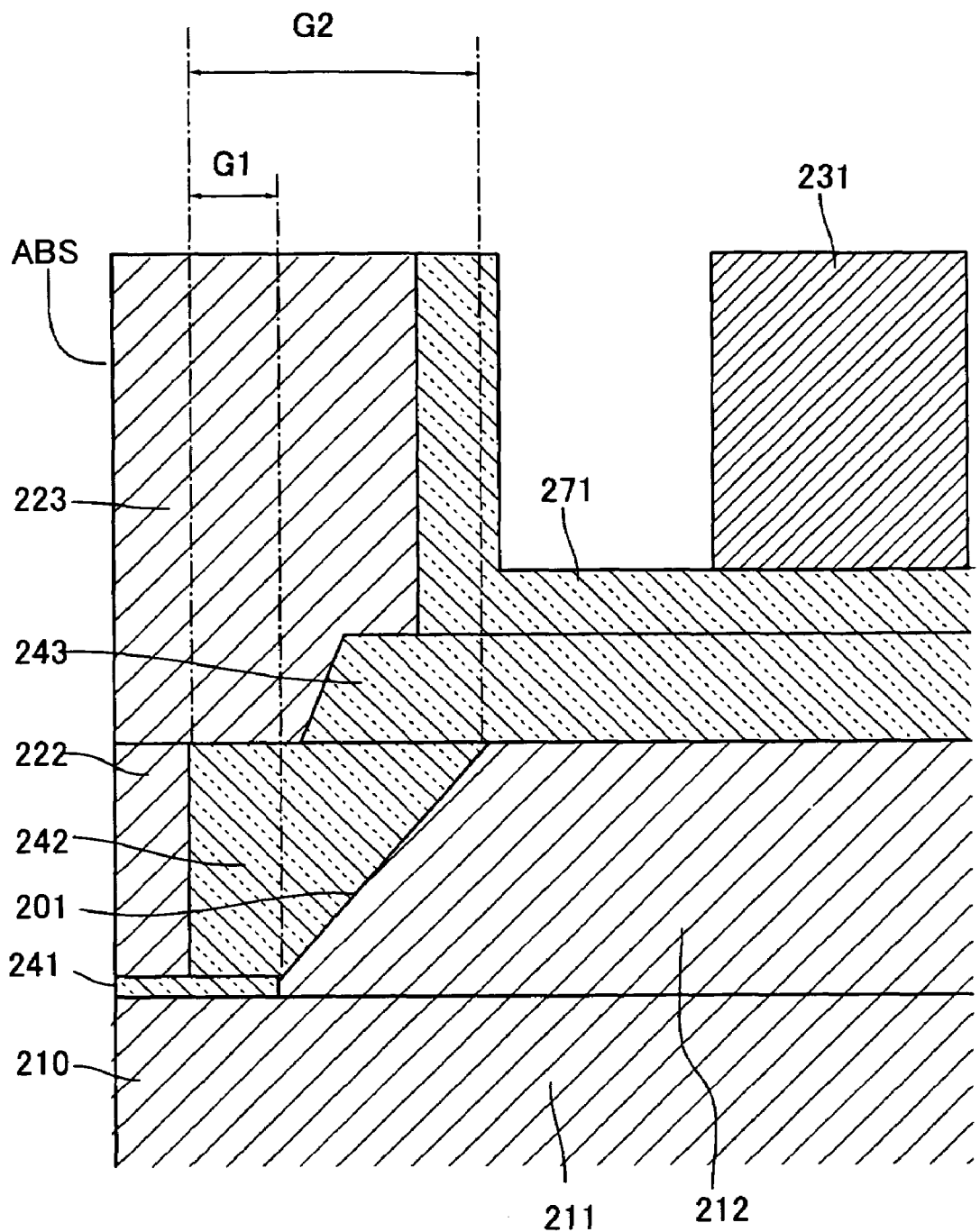
FIG. 5 is a cross-sectional view showing the configuration of the element part depicted in FIGS. 3A and B in an enlarging manner.

Further, as shown in FIG. 5, the end portion of the second write shield portion 223 on the upper yoke magnetic pole film 212 side is caused to slightly protrude from the first write shield portion 222 along the surface of the insulating film 242. Furthermore, the protruding end edge is obliquely raised upward along an insulating film 243 formed on a flat surface by the upper yoke magnetic pole film 212, the insulating film 242 and the first write shield portion 222, further slightly extended along the surface of the insulating film 243, and vertically raised therefrom. The insulating film 243 is formed of an inorganic insulating material such as alumina, an insulating film 271 is formed on the surface of the insulating film 243, and the thin film coil 231 is formed on the surface of the insulating film 271.

Moreover, in order to increase the data recording density, the lateral width W1 of the magnetic pole end portion 210 is narrowed to provide a narrow track width configuration, and the main magnetic pole film 211 is formed by using a magnetic material having the saturation magnetic flux density higher than that of the upper yoke magnetic pole film 212 in order to avoid occurrence of saturation of a magnetic flux. According to this configuration, the magnetostriction λ of the upper yoke magnetic pole film 212 can be reduced by using a magnetic material having the saturation magnetic flux density lower than that of the main magnetic pole film 211.

This point will be described with reference to FIG. 6B. Since the saturation magnetic flux density of a magnetic material forming the main magnetic pole film 211 is higher than the saturation magnetic flux density of the upper yoke magnetic pole film 212, the magnetostriction λ is hard to be reduced. Therefore, even if directions of magnetization ms are aligned in a direction along the ABS, a direction of residual magnetization mr after end of a write operation of the main magnetic pole film 211 tends to face the ABS side and a direction different from the direction along the ABS (a different direction).

On the contrary, in the present invention, as described above, since the magnetostriction λ can be reduced by forming the upper yoke magnetic pole film 212 with a magnetic material whose saturation magnetic flux density is lower than that of the main magnetic pole film 211, a direction of residual magnetization after the write operation of the upper yoke magnetic pole film 212 can be prevented from facing a different direction.

Figure 6B:
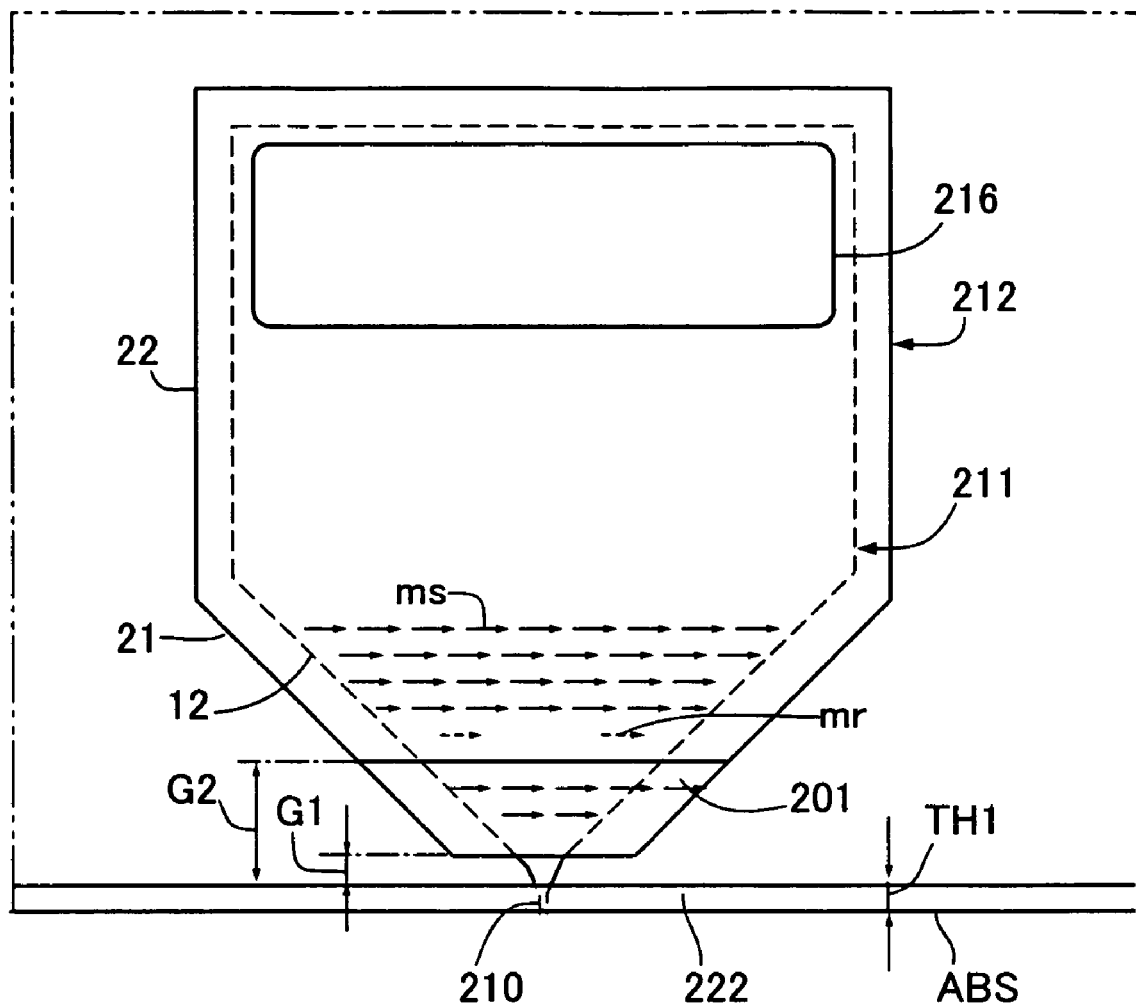
FIG. 6B is a plan view illustrating the configuration of the element part depicted in FIG. 6A and its effect.

Additionally, since such an upper yoke magnetic pole film 212 is provided on the main magnetic pole film 211, a direction of residual magnetization mr after termination of the write operation of the main magnetic pole film 211 is corrected by magnetization in the upper yoke magnetic pole film 212 so as not to face a different direction as shown in FIG. 6B.

That is, by providing the upper yoke magnetic pole film 212 on the main magnetic pole film 211, a direction of residual magnetization mr of the main magnetic pole film 211 after end of the write operation is corrected by magnetization in the upper yoke magnetic pole film 212. Therefore, data already written in the magnetic disk is not erased by a leakage flux caused due to the residual magnetization mr. Accordingly, occurrence of pole erasure can be effectively avoided while improving the recording density. It is to be noted that pole erasure means a phenomenon that a leakage magnetic flux flows from the ABS to the magnetic disk to erase any other data even though a write current is not passed to the thin coil after writing data in the magnetic disk having the large maximum coercivity Hc.

A tensile film 251 which is in contact with the main magnetic pole film 211 may be provided between the insulating film 34 and the main magnetic pole film 211. This tensile film consists of Ta, W, Mo, TiW, TiN, Cr, NiCr or the like, and it is a high-tension film formed by applying the high tensile force equal to or above 200 MPa. When the tensile film 251 is provided, a direction of the residual magnetization mr after end of the write operation of the main magnetic pole film 211 can be maintained in a direction along the ABS. Therefore, the thin film magnetic head 302 can effectively avoid occurrence of pole erasure.

Figure 7:
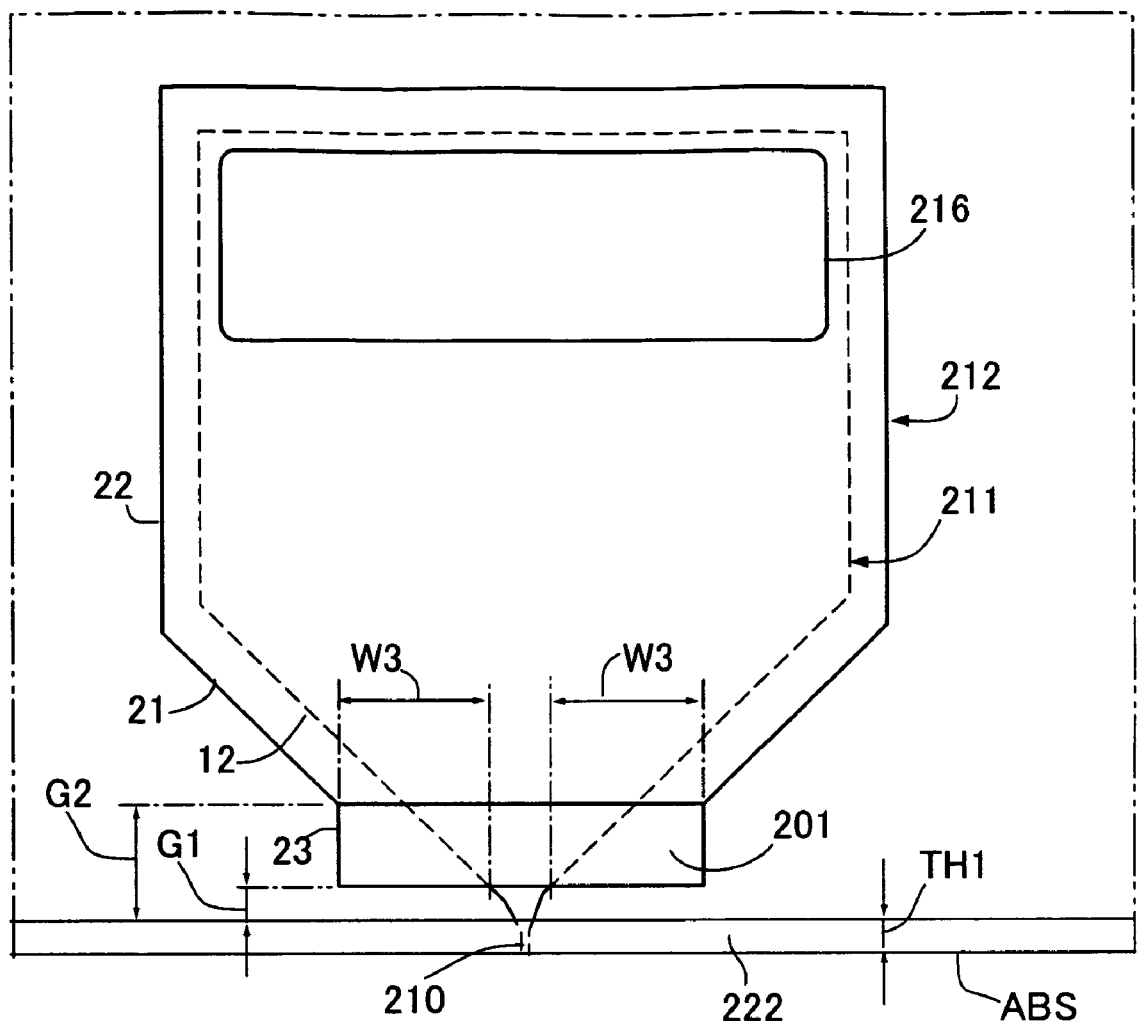
FIG. 7 is a plan view showing another relationship between the upper yoke magnetic film and the shield end portion of the write shield film with respect to the configuration of the element part depicted in FIGS. 3A and B.

FIG. 7 is a plan view showing another example of the upper yoke magnetic pole film 212. In the drawing, like reference numerals denote parts corresponding to the constituent parts shown in FIGS. 6A and 6B, thereby eliminating the tautological explanation. In this embodiment, a linear portion 23 is provided at the end portion of the upper yoke magnetic pole film 212 on the ABS side, thereby increasing a magnetic volume in this part.

In the above-described embodiment, although the example where the upper yoke magnetic pole film 212 comprises a single layer has been described, the upper yoke magnetic pole film 212 may comprise a plurality of layers. When the upper yoke magnetic pole film 212 comprises a plurality of layers, the end portions of the upper yoke magnetic pole films in the respective layers can be sequentially retracted in a direction distanced from the ABS. This example will now be described.

<Embodiment 2 of Thin Film Magnetic Head>

Figure 8:
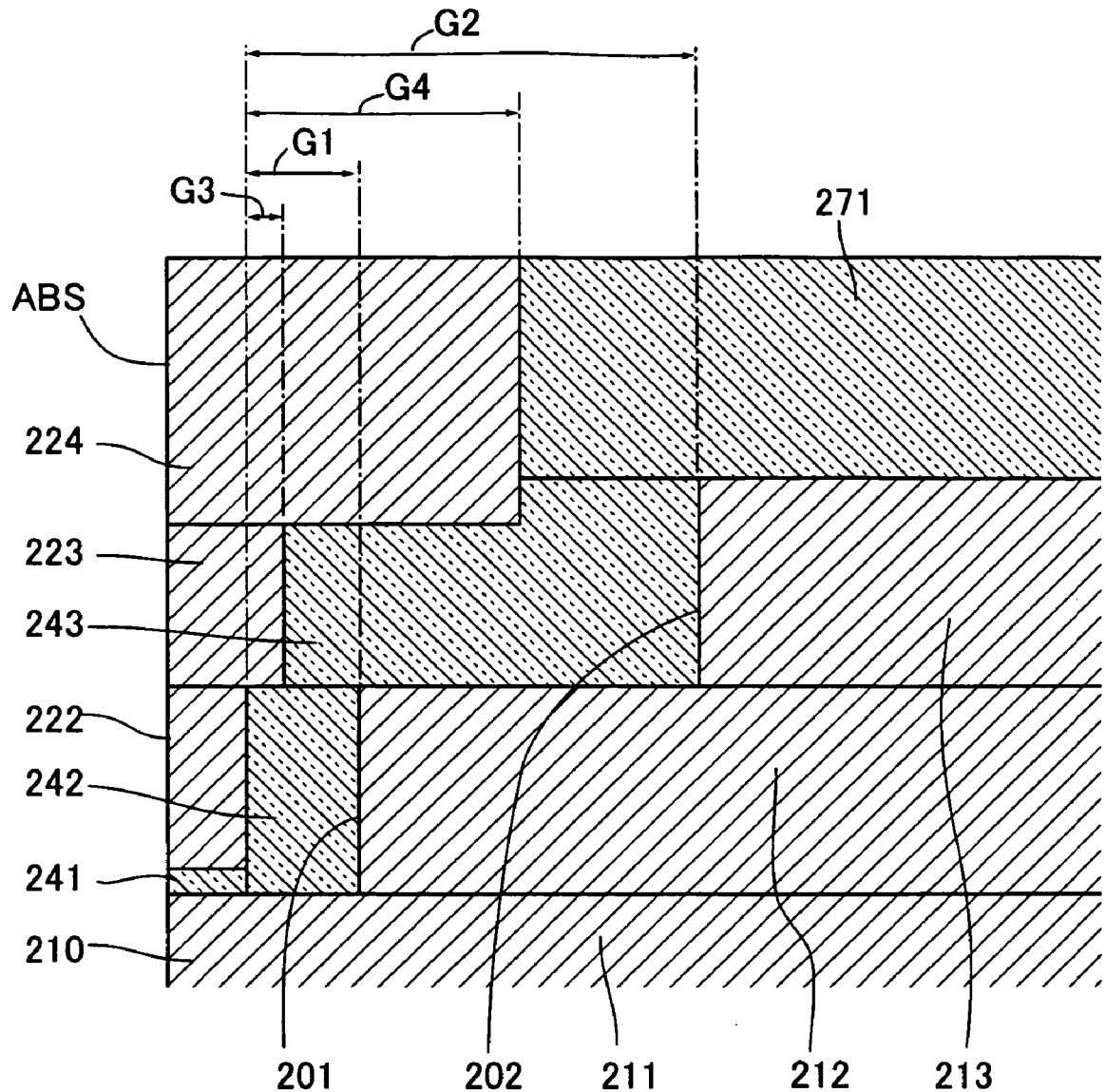
FIG. 8 is a cross-sectional view showing another example of the configuration of the element part.

First, FIG. 8 shows an example having a first upper yoke magnetic pole film 212, a second upper yoke magnetic pole film 213, a second write shield portion 223 and a third write shield portion 224. In the first upper yoke magnetic pole film 212, an end portion 201 thereof on the ABS side is arranged apart from the first write shield portion 222 with a gap G1 therebetween. In the second upper yoke magnetic pole film 213, an end portion 202 thereof on the ABS side is arranged apart from the first write shield portion 222 with a gap G2 therebetween. With the first write shield portion 222 being determined as a reference, the second write shield portion 223 protrudes in a direction of the second upper magnetic pole film 213 by a protrusion quantity G3, and the third write shield portion 224 protrudes by a protrusion quantity G4.

Therefore, gaps between the end portion 201 of the first upper yoke magnetic pole film 212 and the first write shield portion 222, the second write shield portion 223 and the third write shield portion 224 respectively gradually vary like G1 and (G1-G3). Furthermore, gaps between the end portion 202 of the second upper yoke magnetic pole film 213, and the second write shield portion 223 and the third write shield portion 224 respectively gradually vary like (G2-G3) and (G2-G4). With such a gradual change in gap, a magnetic flux leaking from the end portions 201 and 202 of the first upper yoke magnetic pole film 212 and the second upper yoke portion 213 can be prevented from generating magnetic saturation of the first write shield portion 222, the second write shield portion 223 and the third write shield portion 224.

Moreover, since the write shield portion 222 facing the magnetic pole end 210 can be prevented from generating magnetic saturation, the end portion 201 of the upper yoke magnetic pole film 212 can be arranged close to the ABS, thereby further improving the overwrite characteristics.

<Embodiment 3 of Thin Film Magnetic Head>

Figure 9:
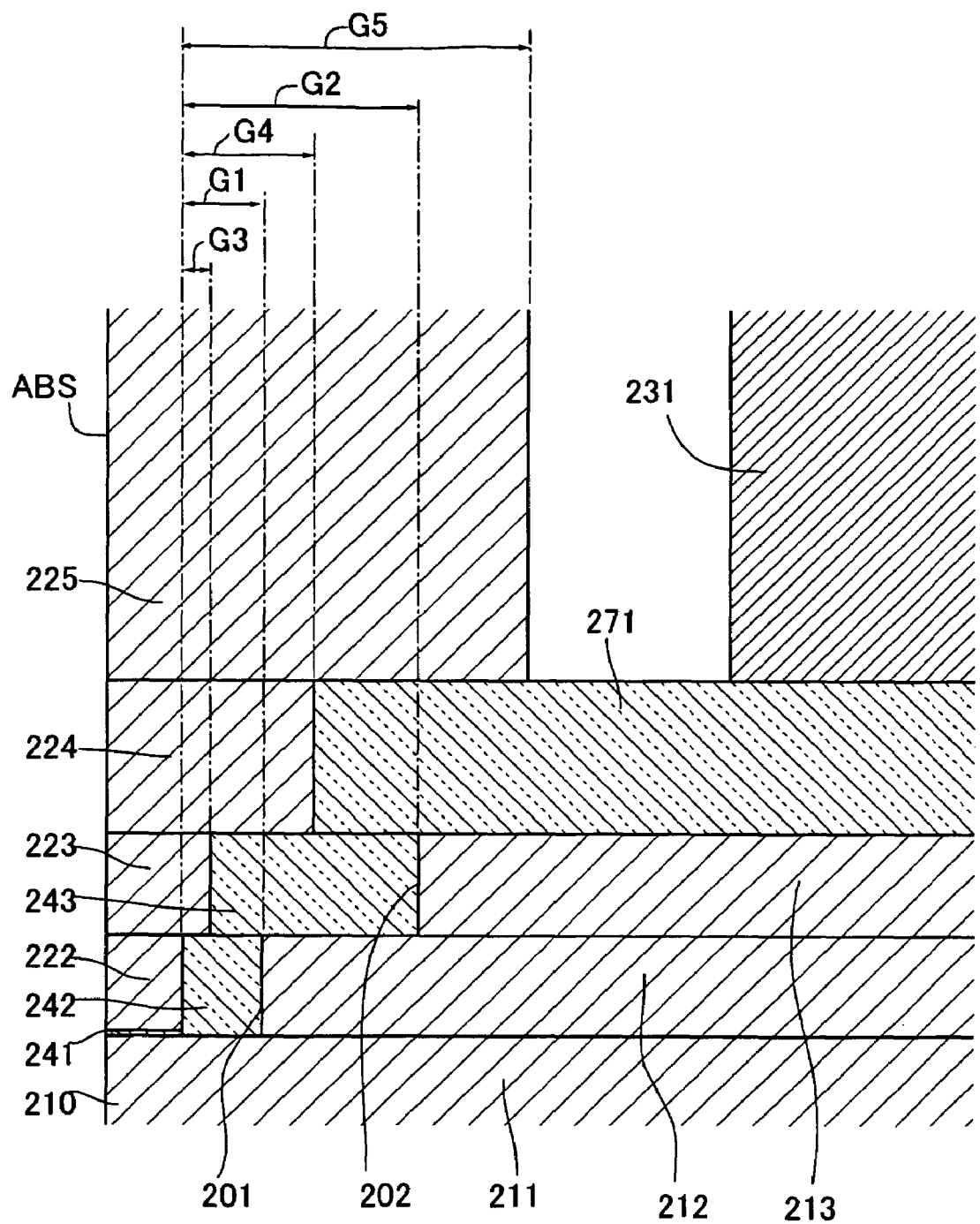
FIG. 9 is a cross-sectional view showing still another example of the configuration of the element part.

FIG. 9 shows an example having a first upper yoke magnetic pole film 212, a second upper yoke magnetic pole film 213, a second write shield portion 223, a third write shield portion 224 and a fourth write shield portion 225. The first upper yoke magnetic pole film 212 has an end portion 201 on the ABS side being arranged apart from the first write shield portion 222 by a gap G1. The second upper yoke magnetic pole film 213 has an end portion 202 on the ABS side being arranged apart from the first write shield portion 222 by a gap G2. With the first write shield portion 222 being determined as a reference, the second write shield portion 223 protrudes in a direction of the second upper magnetic pole film 213 by a protrusion quantity G3, and the third write shield portion 224 protrudes by a protrusion quantity G4. Therefore, gaps of the end portion 201 of the first upper yoke magnetic pole film 212 and the end portion 202 of the second upper yoke magnetic pole film 213 with respect to the first write shield portion 222, the second write shield portion 223 and the third write shield portion 224 gradually vary like G, (G1-G3), (G2-G3) and (G2-G4). In addition to this gradual change in gaps, the fourth write shield portion 225 overlaps the second upper yoke magnetic pole film 213 by (G5-G2) through an amount corresponding to a thickness of the insulating film 271. Therefore, a magnetic flux leaking from the end portions 201 and 202 of the first upper yoke magnetic pole film 212 and the second upper yoke portion 213 can be prevented from generating magnetic saturation of the first write shield portion 222, the second write shield portion 223, the third write shield portion 224 and the fourth write shield portion 225.

Furthermore, since the write shield portion 222 facing the magnetic pole end 210 can be prevented from generating magnetic saturation, the end portion 201 of the upper yoke magnetic pole film 212 can be arranged close to the ABS, thereby improving the overwrite characteristics.

<Embodiment 4 of Thin Film Magnetic Head>

Figure 10:
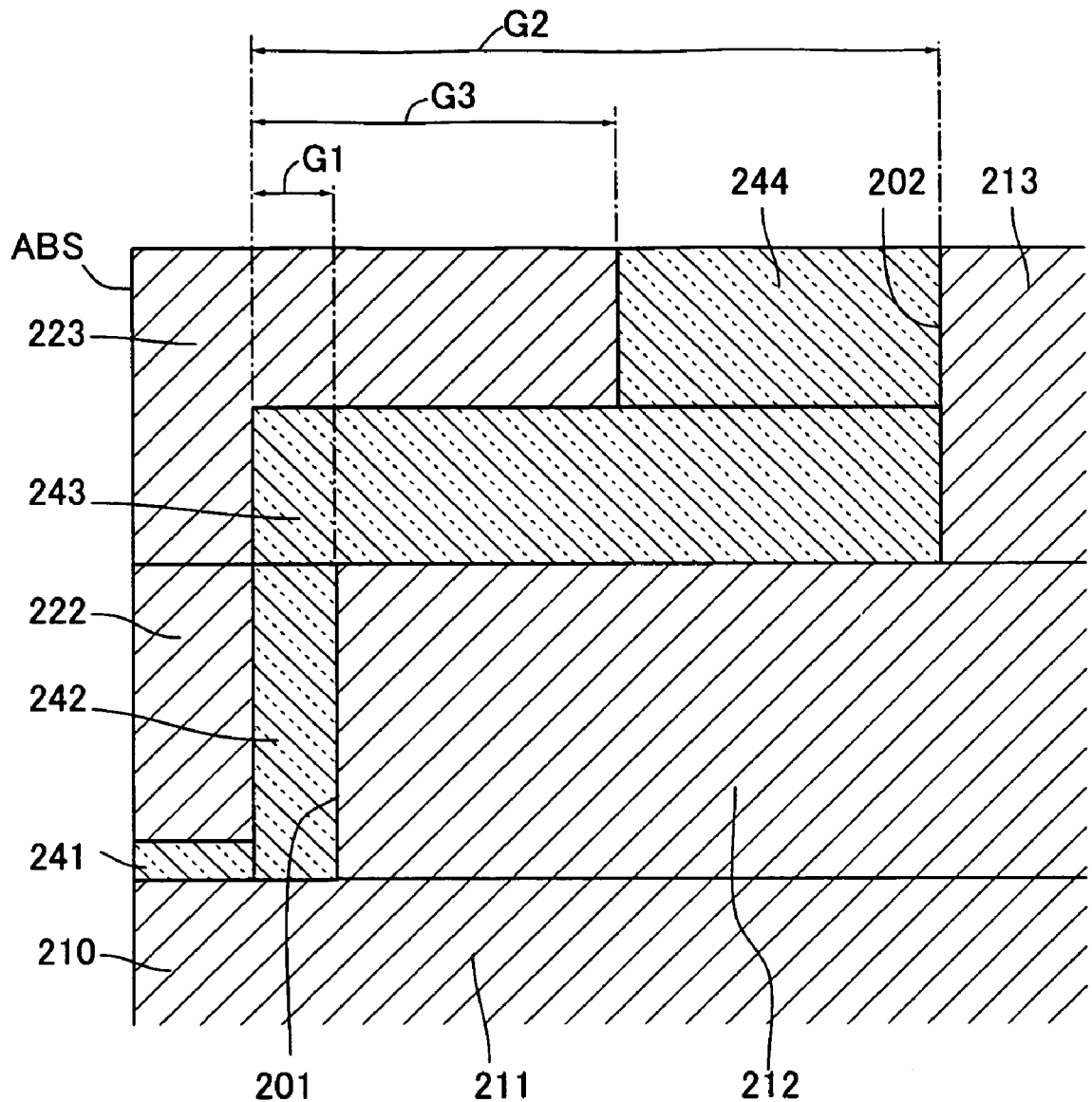
FIG. 10 is a cross-sectional view showing yet another example of the configuration of the element part.

FIG. 10 shows an example having a first upper yoke magnetic pole film 212, a second upper yoke magnetic pole film 213 and a second write shield portion 223. In the first upper yoke magnetic pole film 212, an end portion 201 thereof on the ABS side is arranged apart from the first write shield portion 222 with a gap G1 therebetween. In the second upper yoke magnetic pole film 213, an end portion 202 thereof on the ABS side is arranged apart from the first write shield portion 222 with a gap G2 therebetween. With the first write shield portion 222 being determined as a reference, the second write shield portion 223 protrudes in a direction of the second upper magnetic pole film 213 by a protrusion quantity G3.

Therefore, gaps of the end portion 201 of the first upper yoke magnetic pole film 212 and the end portion 202 of the second upper yoke magnetic pole film 213 with respect to the first write shield portion 222 and the second write shield portion 223 gradually vary like G1 and (G2-G3). In addition to this gradual change in gaps, the second write shield portion 223 overlaps the second upper yoke magnetic pole film 213 by (G3-G1) through an amount corresponding to a thickness of an insulating film 243. Therefore, the first write shield portion 222 and the second write shield portion 223 can be prevented from generating magnetic saturation due to a magnetic flux leaking from the end portions 201 and 202 of the first upper yoke magnetic pole film 212 and the second upper yoke portion 213.

Further, since the write shield portion 222 facing the magnetic pole end 210 can be prevented from generating magnetic saturation, the end portion 201 of the upper yoke magnetic pole film 212 can be arranged close to the ABS, thereby improving the overwrite characteristics.

Some specific embodiments will now be described with reference to FIGS. 11 to 14. In these drawings, like reference numerals denote parts corresponding to those shown in the foregoing drawings, thereby eliminating the tautological explanation.

<Embodiment 5 of Thin Film Magnetic Head>

Figure 11A:
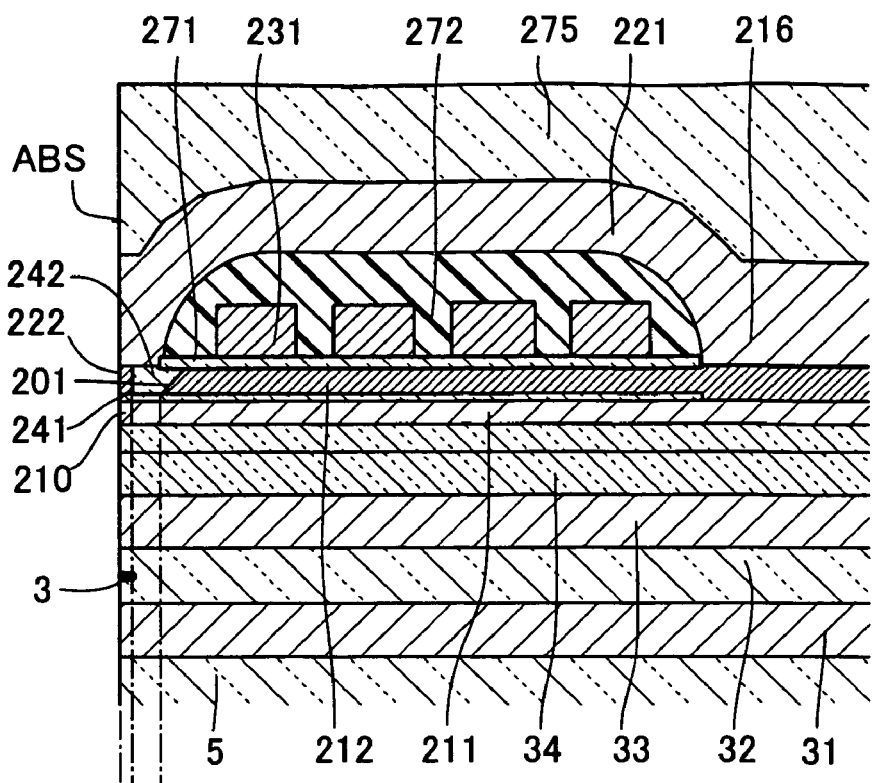
FIG. 11A is a cross-sectional view showing still another example of the thin film magnetic head according to the present invention.
Figure 11B:
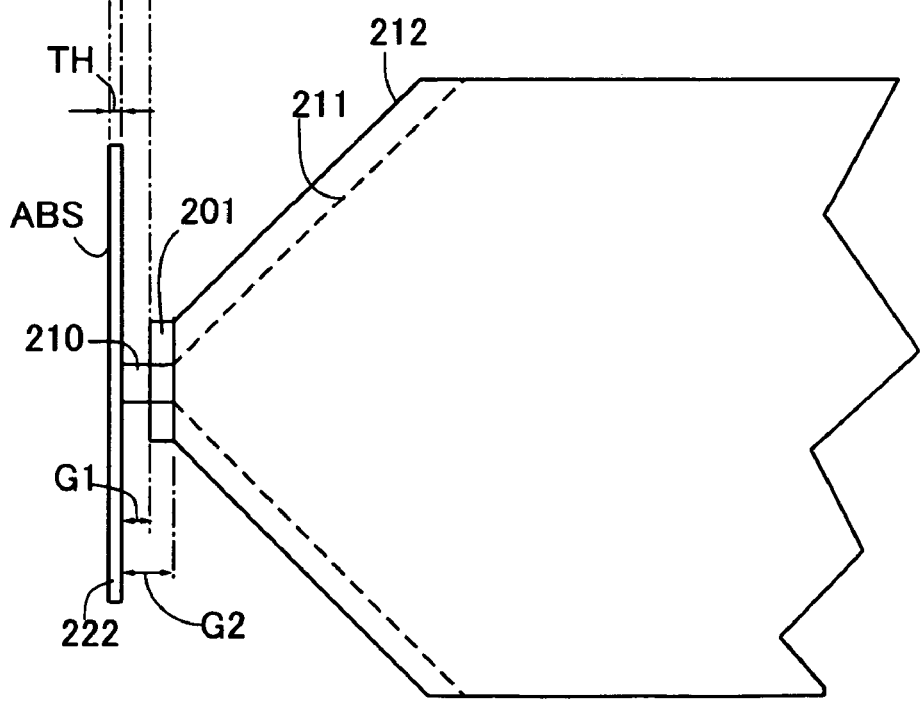
FIG. 11B is a cross-sectional view showing a relationship between an upper yoke magnetic film and a shield end portion of a write shield film with respect to the thin film magnetic head depicted in FIG. 11A.
Figure 11C:
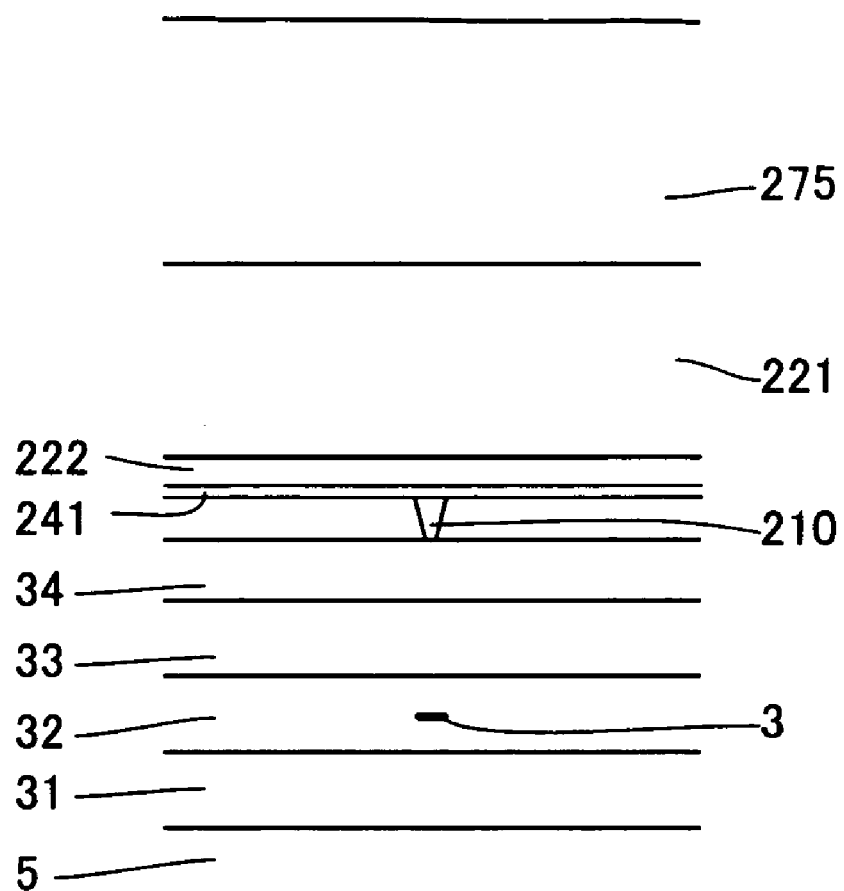
FIG. 11C is a front view showing the thin film magnetic head depicted in FIGS. 11A and 11B from an ABS side.

First, referring to FIGS. 11A to 11C, an upper yoke magnetic pole film 212 is provided on the surface of a main magnetic pole film 211 on the side close to a thin film coil 231, and formed after the main magnetic pole film 211. Therefore, a length of a small-width part having a track width is determined by a magnetic pole end portion 210, and it is possible to set a length as expected without deviating from a design length. Accordingly, the upper yoke magnetic pole film 212 can be formed close to the ABS.

Furthermore, the upper yoke magnetic pole film 212 has the size larger than that of the yoke portion of the main magnetic pole film 211, and also has a large magnetic volume. Therefore, the upper yoke magnetic pole film 212 having a large magnetic charge can be arranged close to the ABS, and a magnetic charge in the vicinity of the ABS can be increased. Accordingly, the overwrite characteristics can be improved.

Moreover, the upper yoke magnetic pole film 212 and the first write shield portion 222 are provided, and the first write shield portion 222 is arranged so as to face the magnetic pole end portion 210 with a recording gap film 241 therebetween in the ABS. This first write shield portion 222 enables absorption of a returning magnetic flux from a magnetic disk, thereby avoiding leakage of excessive magnetism. As a result, even when the upper yoke magnetic pole film 212 is formed close to the ABS, the excellent overwrite characteristics can be maintained, and ATE can be avoided.

An end portion of the upper yoke magnetic pole film 212 facing the first write shield portion 222 with gaps G1 and G2 is formed as an inclined surface 201. According to this configuration, since an interval between the end portion of the upper yoke magnetic pole film 212 and the first write shield portion 222 is increased from the gap G1 to the gap G2 as distanced from the ABS, a magnetic flux leaking from the end portion of the upper yoke magnetic pole film 212 can be prevented from generating magnetic saturation of the first write shield portion 222 of the write shield film 211.

Moreover, since the write shield portion 222 facing the magnetic pole end 210 of the main magnetic pole film 211 can be prevented from generating magnetic saturation, the end portion of the upper yoke magnetic pole film 212 can be arranged closer to the ABS, thereby improving the overwrite characteristics.

The recording gap film 241 is provided between the main magnetic pole film 211 and the first upper yoke film 212, and the write shield film 221 extends to the front of a position where it is connected with the first upper yoke film 212. Therefore, two magnetic circuits of the main magnetic pole film 211 and the first upper yoke film 212 are constituted.

<Embodiment 6 of Thin Film Magnetic Head>

Figure 12B:
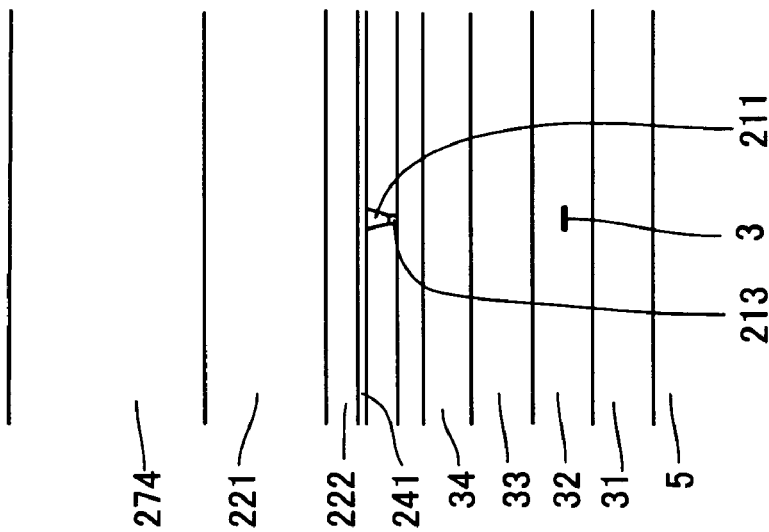
FIG. 12B is a front view showing the thin film magnetic head depicted in FIG. 12A from the ABS side.
Figure 12A:
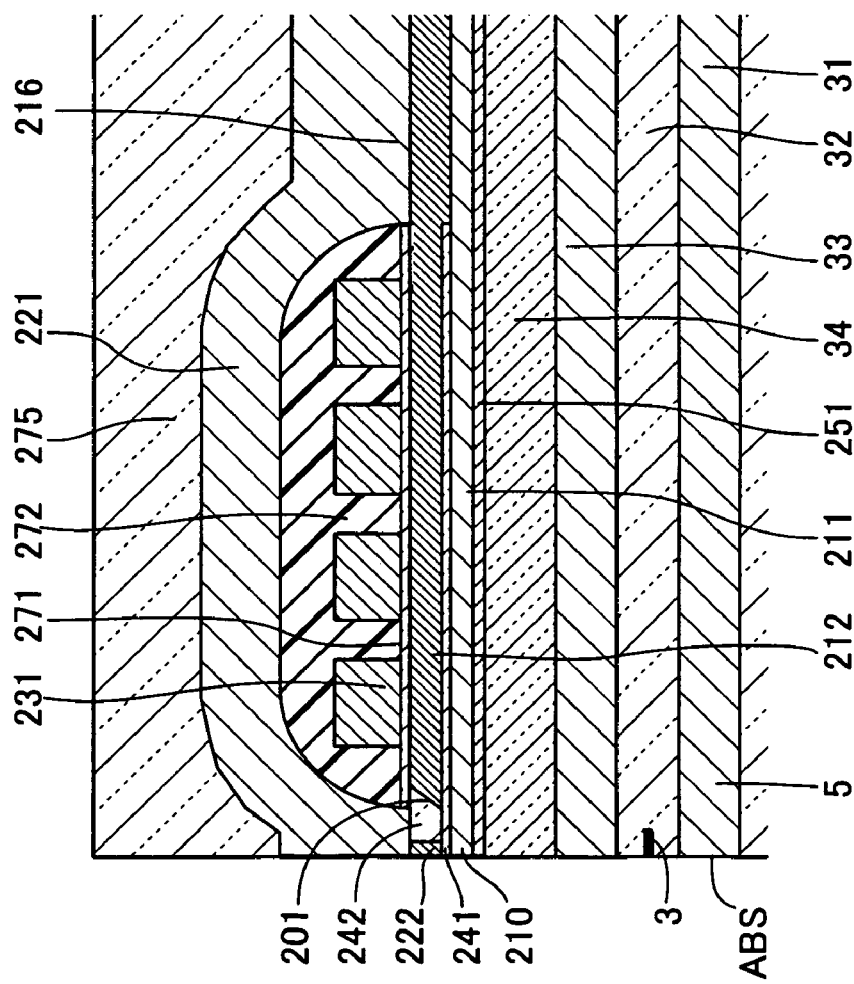
FIG. 12A is a cross-sectional view showing yet another example of the thin film magnetic head according to the present invention.

In an embodiment shown in FIGS. 12A and 12B, a tensile film 251 which is in contact with a main magnetic pole film 211 is provided between an insulating film 34 and the main magnetic pole film 211. This tensile film 251 is formed of Ta, W, Mo, TiW, TiN, Cr, NiCr or the like, and it is a high-tension film formed by applying a high tensile force which is not smaller than 200 MPa. When the tensile film 251 is provided, a direction of residual magnetization mr after end of a write operation in the main magnetic pole film 211 can be maintained in a direction along the ABS. Therefore, the thin film magnetic head can effectively avoid occurrence of pole erasure.

The fact that an upper yoke magnetic pole film 212 is provided on the surface of the main magnetic pole film 211 on the side close to a thin film coil 231 and formed after the main magnetic pole film 211 and that an end portion of the upper yoke magnetic pole film 212 facing the first write shield portion 222 is formed as an inclined surface 201 is the same as the embodiment shown in FIGS. 11A to 11C, and hence the embodiment shown in FIGS. 12A and 12B can obtain the effects and advantages described in conjunction with the embodiment depicted in FIGS. 11A to 11C.

<Embodiment 7 of Thin Film Magnetic Head>

Figures 13A, 13B:
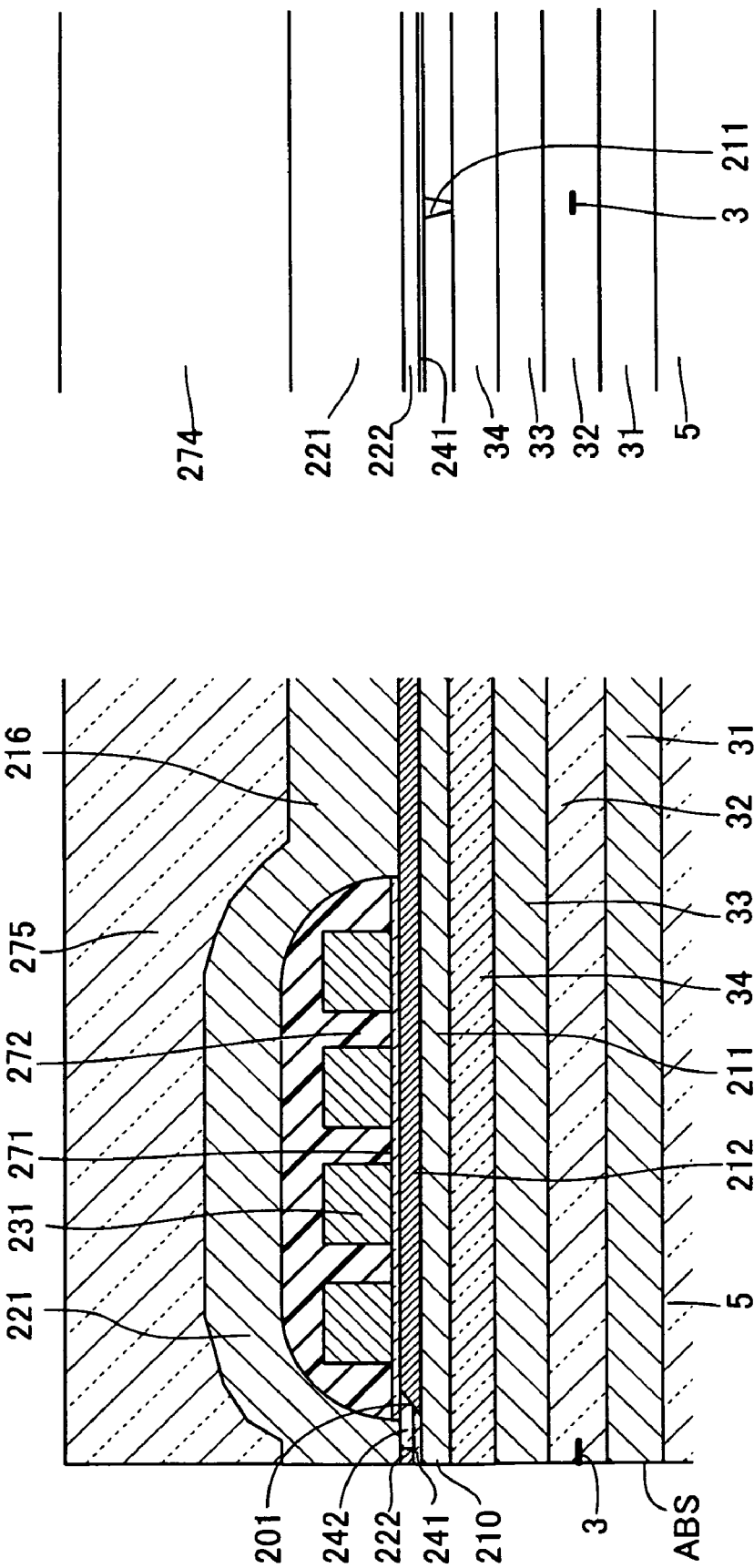
FIG. 13A is a cross-sectional view showing a further example of the thin film magnetic head according to the present invention.
FIG. 13B is a front view showing the thin film magnetic head depicted in FIG. 13A from the ABS side.

An embodiment of FIGS. 13A and 13B is based on the embodiment depicted in FIGS. 11A to 11C, and shows an example in which a recording gap film 241 is arranged between an end of an upper yoke magnetic pole film 212 and an ABS.

<Embodiment 8 of Thin Film Magnetic Head>

Figure 14B:
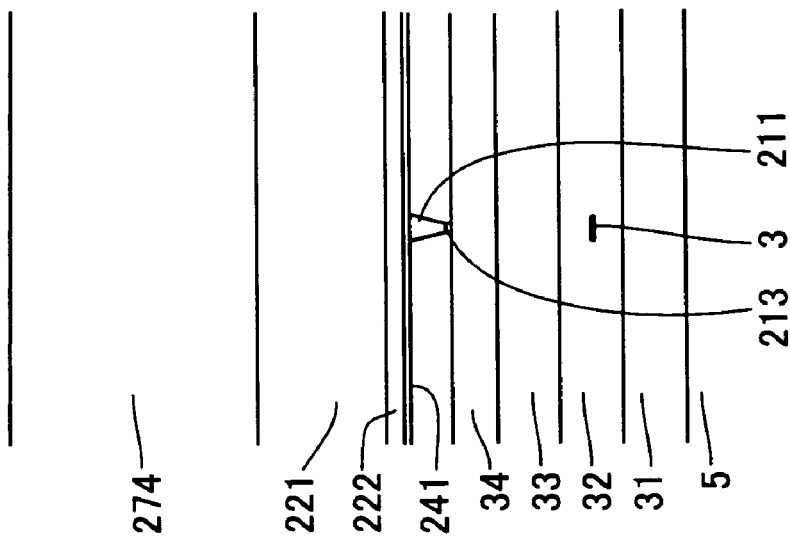
FIG. 14B is a front view showing the thin film magnetic head depicted in FIG. 12A from the ABS side.
Figure 14A:
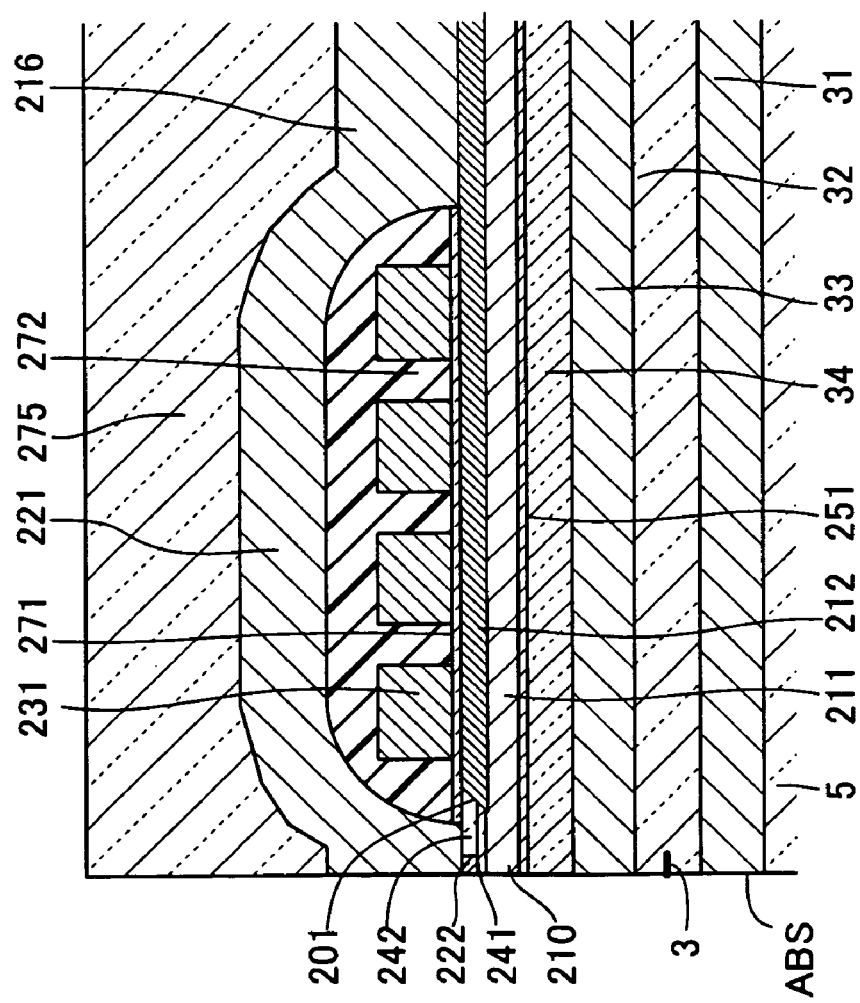
FIG. 14A is a cross-sectional view showing a still further example of the thin film magnetic head according to the present invention.

An embodiment of FIGS. 14A and 14B is based on the embodiment depicted in FIGS. 12A and 12B, shows an example in which a recording gap film 241 is arranged between an end of an upper yoke magnetic pole film 212 and an ABS, and demonstrates the same effects and advantages as those of the embodiment shown in FIGS. 12A and 12B.

2. Method of Manufacturing Thin Film Magnetic Head (1) Method of Manufacturing Thin Film Magnetic Head Illustrated in FIGS. 1 to 7.

Now, referring to FIGS. 15A and 15B to FIGS. 20A and 20B, a method of manufacturing a thin film magnetic head shown in FIGS. 1 to 7 will be described. It is to be noted that manufacturing processes are all executed on a wafer, and one of many elements formed on the wafer is selectively shown in the drawings described below.

Figure 15B:
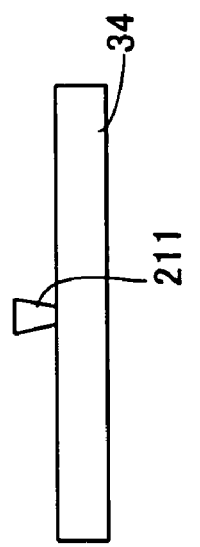
FIG. 15B is a front view showing the state depicted in FIG. 15A from the ABS side.
Figure 15A:
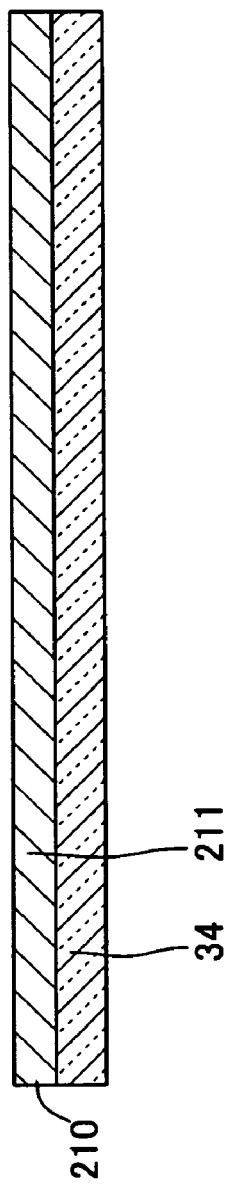
FIG. 15A is a cross-sectional view showing a thin film magnetic head manufacturing method according to the present invention.

<Steps to Reach State Shown in FIGS. 15A and 15B>

First, in a stage depicted in FIGS. 15A and 15B, it is assumed that a manufacturing process of forming the main magnetic pole film 211 has been already completed in a step of obtaining the thin film magnetic head shown in FIGS. 3A and 3B. Giving a description on the outline of the manufacturing process with reference to FIGS. 3A and 3B, the first shield film 31, the insulating film 32, the second shield film 33 and the insulating film 34 are sequentially formed on the slider 5 consisting of, e.g., aluminum oxide titanium carbide ($Al_2O_3.TiC$), and the read element 3 is already formed in the insulating film 32. And, a tensile film 251 is formed on the insulating film 34, if needed.

FIGS. 15A and 15B shows a state in which the main magnetic pole film 211 is formed on the insulating film 34 formed through the above-described manufacturing process. The main magnetic pole film 211 has a thickness of approximately 0.6 to 0.8 μm, and it is formed to have the magnetic pole end portion 210 on the ABS side by performing plating using as a magnetic material CoFe or CoNiFe having the high saturation magnetic flux density of 2.3 T to 2.4 T. Subsequently, when an electrode film (not shown) formed in order to carry out plating is removed, the state shown in FIGS. 15A and 15B is obtained. At this time, a plated layer is formed with a thickness of approximately 0.7 μm <Step to Reach State Shown in FIGS. 16A and 16B>

Figure 16A:
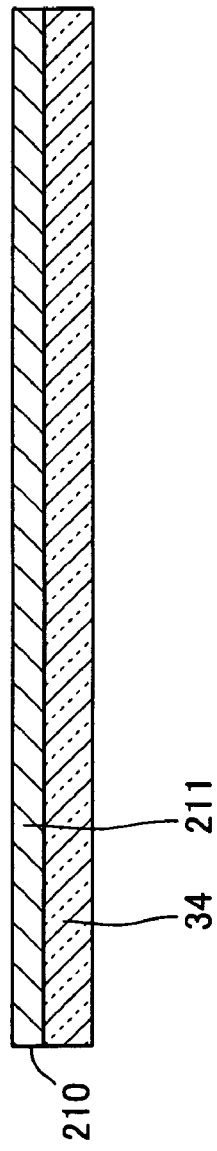
FIG. 16A is a cross-sectional view showing a step after the step depicted in FIGS. 15A and 15B.
Figure 16B:
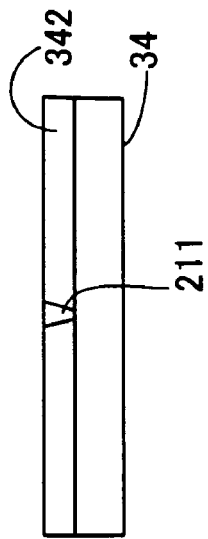
FIG. 16B is a front view showing the state depicted in FIG. 15A from the ABS side.

As shown in FIGS. 16A and 16B, an insulating portion 342 consisting of alumina ($Al_2O_3$) is formed with a thickness of, e.g., 0.5 to 1.0 μm on the entire surface, and the surface of this insulating portion 342 is polished based on, e.g., chemical mechanical polishing (which will be referred to as CMP hereinafter) so that a height of the main magnetic pole film 211 becomes approximately 0.2 to 0.25 μm, thereby effecting planarization processing of the surface.

Here, after polishing based on CMP or before polishing based on CMP, it is good enough to carry out annealing with respect to at least the surface of the magnetic pole end portion 210 of the main magnetic pole film 211 at 200 to 260° C. Performing this annealing can reduce the influence of residual magnetization in the magnetic pole end portion 210 after end of a write operation. It is to be noted that this annealing may be performed after forming the later-described recording gap film 241.

Subsequently, a film required to form the recording gap film 241 is formed with a film thickness of 40 nm to 50 nm so as to cover the entire upper surface of the laminated body. A material of this film may be an insulating material such as alumina or a non-magnetic metallic material such as Ru, NiCu, Ta, W, Cr, $Al_2O_3$, $Si_2O_3$ or the like. Furthermore, this film is selectively etched so that an area on the ABS side remains and a part of the main magnetic pole film 211 apart from the ABS is exposed. As a result, the recording gap film 241 is formed.

Figure 17A:
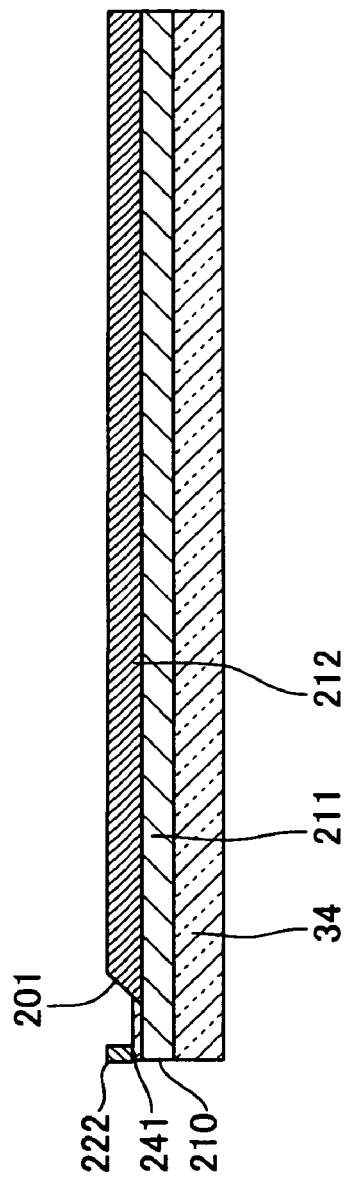
FIG. 17A is a cross-sectional view showing a step after the step depicted in FIGS. 16A and 16B.
Figure 17B:
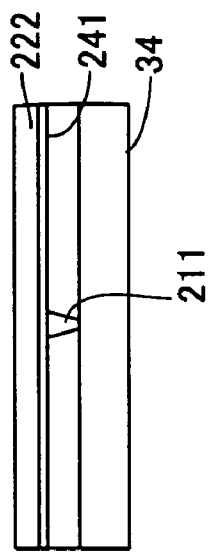
FIG. 17B is a front view showing the state depicted in FIG. 17A from the ABS side.

<Step to Reach State Shown in FIGS. 17A and 17B>

Based on a plating method, the upper yoke magnetic pole film 212 and the first write shield portion 222 are together formed with a thickness of approximately 0.3 to 1.0 μm on the entire surface of the laminated body in the same step by using as a magnetic material NiFe having the saturation magnetic flux density of 1.0 to 1.6 T or CoNiFe having the saturation magnetic flux density of 1.9 to 2.1 T, the small magnetostriction λ and the small maximum coercivity Hc.

The upper yoke magnetic pole film 212 is formed so as to be bonded to a part of the main magnetic pole film 211 which is not covered with the recording gap film 241, and the first write shield portion 222 is formed so as to be connected with the ABS side of the recording gap layer 241. Moreover, the upper yoke magnetic pole film 212 and the first write shield portion 222 are formed in such a manner that their end surfaces have the same height in a subsequent step. Additionally, the first write shield portion 222 is formed at a position where a throat height is determined so as to face the magnetic pole end portion 210 with the recording gap film 241 therebetween in the ABS.

The upper yoke magnetic pole film 212 is subjected to dry etching based on, e.g., reactive ion etching (which will be referred to as RIE hereinafter) or ion beam etching (which will be referred to as IBE hereinafter) so that an inclined surface 201 is generated at the leading end portion, i.e., the end portion facing the first write shield portion 222.

The upper yoke magnetic pole film 212 and the first write shield portion 222 can be formed by a plating method using CoNiFe or NiFe as a magnetic material. Further, they can be formed by a sputtering method using a magnetic material such as FeN, FeCoZrO, FeAlN or the like (each magnetic material has the small magnetostriction λ and maximum coercivity Hc and the saturation magnetic flux density of 1.9 to 20 T). FIGS. 17A and 17B shows a state after the above-described steps are terminated.

Figure 18A:
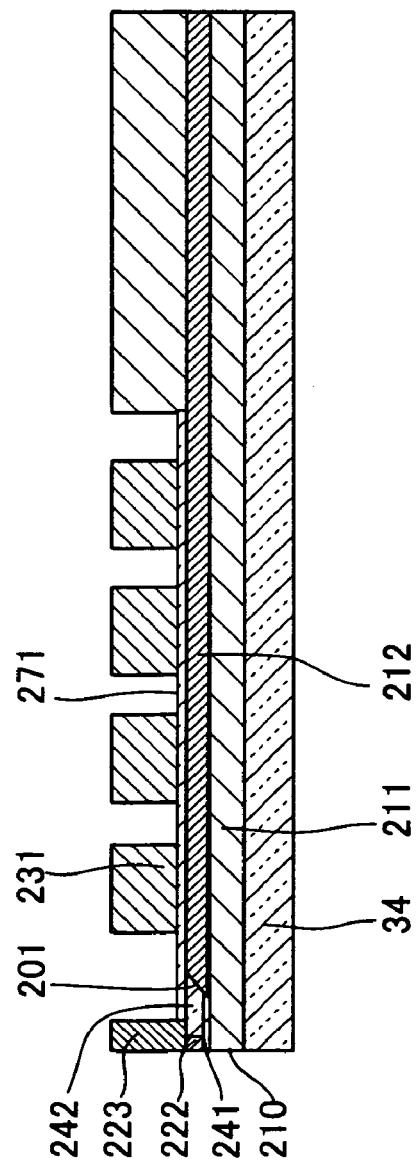
FIG. 18A is a cross-sectional view showing a step after the step depicted in FIGS. 17A and 17B.
Figure 18B:
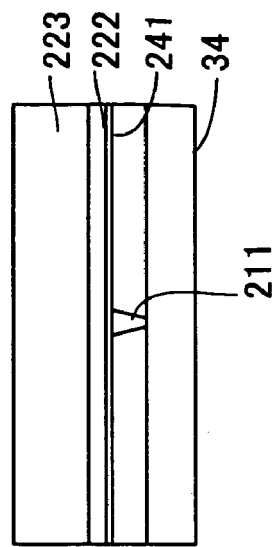
FIG. 18B is a front view showing the state depicted in FIG. 18A from the ABS side.

<Step to Reach State Shown in FIGS. 18A and 18B>

The insulating film 242 consisting of alumina ($Al_2O_3$) is formed with a thickness of, e.g., 1.0 to 1.5 μm on the entire surface of the laminated body. Furthermore, the surfaces of the first write shield portion 222 and the upper yoke magnetic pole film 212 are polished by CMP so as to have a thickness of approximately 0.3 to 0.8 μm, thereby planarizing the surfaces. By this planarization processing of the surfaces, the first write shield portion 222, the insulating film 242 and the upper yoke magnetic pole film 212 have end surfaces with the same height.

Subsequently, the insulating film 271 consisting of alumina ($Al_2O_3$) is formed with a thickness of approximately 0.2 μm on the entire surface of the laminated body, and an opening portion is provided at a position where the second write shield portion 223 should be formed. As a result, there can be obtained the insulating film 271 which insulates the thin film coil 231 and the upper yoke magnetic pole film 212 so as not to be short-circuited.

Then, a frame is formed on the insulating film 271 by using an electrode film (not shown) consisting of an electroconductive material and photolithography, and electroplating using the electrode film is then performed, thereby forming a plated layer consisting of Cu. This plated layer and the underlying electrode film serve as the thin film coil 231. The thin film coil 231 is electrically insulated from the upper yoke magnetic pole film 212 by the insulating film 271.

Then, although not shown, a frame is formed by the photolithography, and then the second write shield portion 223 is formed by a frame plating method. The same magnetic material as that of the first write shield portion 222 is used for the second write shield portion 223. It is to be noted that this second write shield portion 223 and the thin film coil 231 may be formed in the reversed order.

Figure 19B:
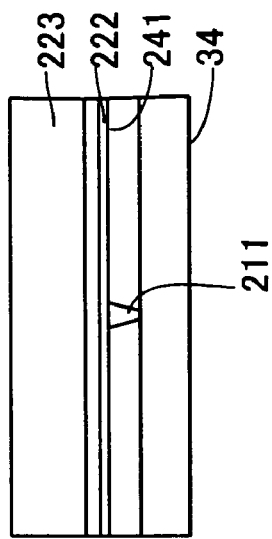
FIG. 19B is a front view showing the state depicted in FIG. 19A from the ABS side.
Figure 19A:
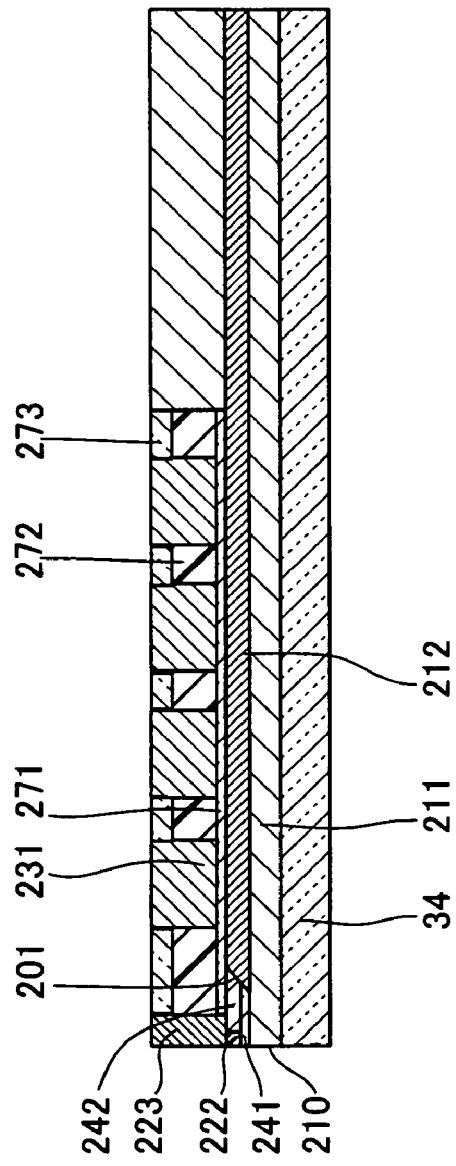
FIG. 19A is a cross-sectional view showing a step after the step depicted in FIGS. 18A and 18B.

<Step to Reach State Shown in FIGS. 19A and 19B>

Moreover, a photoresist is applied to cover the entire surface of the laminated body, then an insulating film consisting of alumina ($Al_2O_3$) is formed, and the entire surface is polished based on CMP, thereby planarizing the surface. In this case, the surfaces of the thin film coil 231 and the second write shield portion 223 are polished based on CMP so as to have a thickness of approximately 2.0 to 2.5 μm.

Figure 20B:
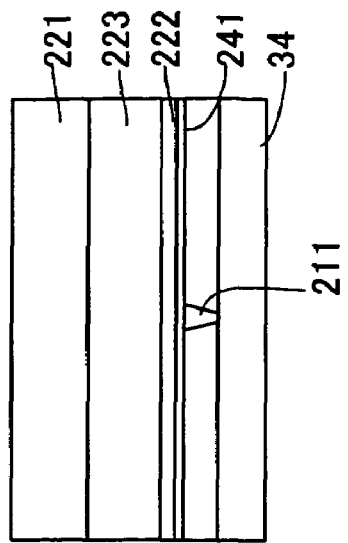
FIG. 20B is a front view showing the state depicted in FIG. 19A from the ABS side.
Figure 20A:
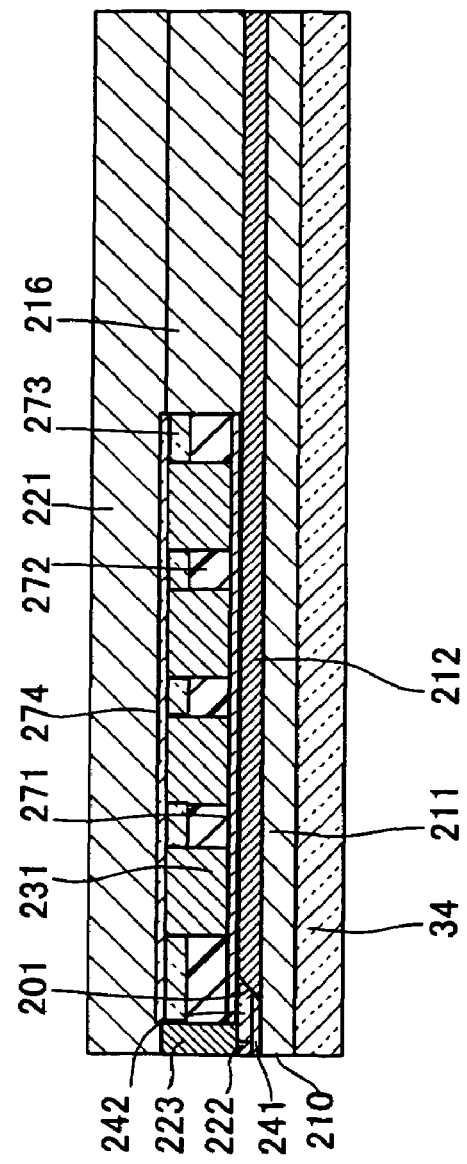
FIG. 20A is a cross-sectional view showing a step after the step depicted in FIGS. 19A and 19B.

<Step to Reach State Shown in FIGS. 20A and 20B>

Subsequently, an insulating film 273 consisting of alumina ($Al_2O_3$) is formed with a thickness of approximately 0.2 μm so as to cover the entire surface of the laminated body, and an opening portion is provided at a position where the second write shield portion 223 is formed. As a result, there can be obtained an insulating film 273 which insulates the thin film coil 231 and the third write shield portion 224 so as not to be short-circuited. Then, the write shield film 221 is formed with a thickness of approximately 2 to 3 μm. Thereafter, a protection film is formed by a sputtering method, thereby obtaining the thin film magnetic head depicted in FIGS. 1 to 7.

(2) A method of Manufacturing Thin Film Magnetic Head Having Magnetic Pole Configuration Shown in FIGS. 8 to 10

A method of manufacturing a thin film magnetic head having the magnetic pole configuration shown in FIGS. 8 to 10 will now be described with reference to FIGS. 21A and 21B to FIGS. 25A and 25B. Although the embodiment shown in FIGS. 8 to 10 is different in the detail of the magnetic pole configuration, the both configurations have the point that the first upper yoke magnetic pole film 212 and the second upper yoke magnetic pole film 213 are provided in common, and they can be basically manufactured by substantially the same process.

Figure 21A:
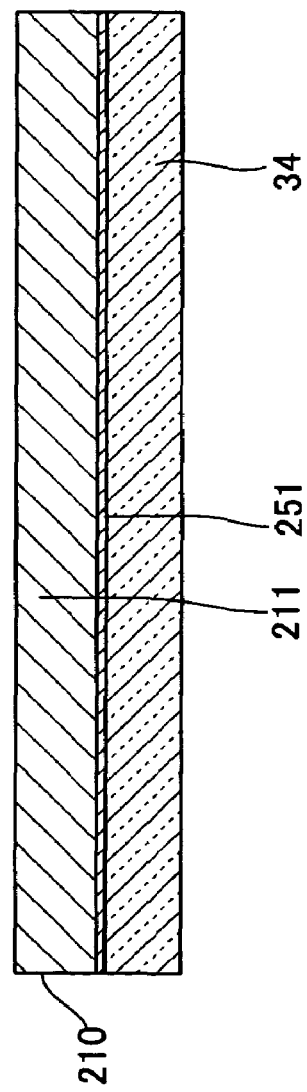
FIG. 21A is a cross-sectional view showing another method of manufacturing the thin film magnetic head according to the present invention.
Figure 21B:
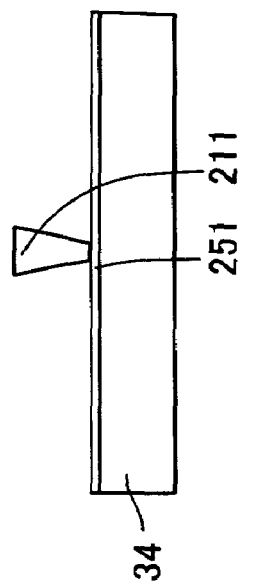
FIG. 21B is a front view showing the state depicted in FIG. 21A from the ABS side.

<Step to Reach State Shown in FIGS. 21A and 21B>

First, at a step shown in FIGS. 21A and 21B, it is assumed that a manufacturing process of forming the main magnetic pole film 211 is terminated in a completed configuration of the thin film magnetic head depicted in FIGS. 3A and 3B. Since the outline of this manufacturing process has been already described, the tautological explanation will be eliminated. FIGS. 21A and 21B show a state in which the main magnetic pole film 211 is formed on the insulating film 34 formed through the above-described manufacturing process. The main magnetic pole film 211 is formed with a thickness of approximately 0.6 to 0.8 μm to have the magnetic pole end portion 210 on the ABS side by plating a magnetic material which is CoFe or CoNiFe having the high saturation magnetic flux density of 2.3 T to 2.4 T. Subsequently, when the electrode film (not shown) formed in order to perform plating is removed, the state shown in FIGS. 21A and 21B can be obtained. At this time, a plated layer is formed with a thickness of approximately 0.7 μm.

Figure 22B:
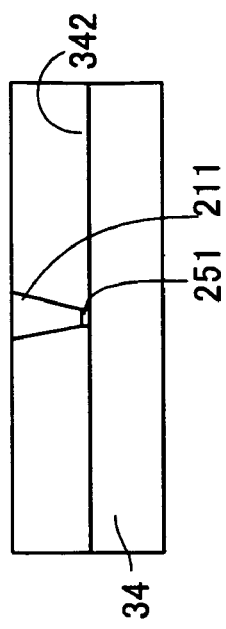
FIG. 22B is a front view showing the state depicted in FIG. 22A from the ABS side.
Figure 22A:
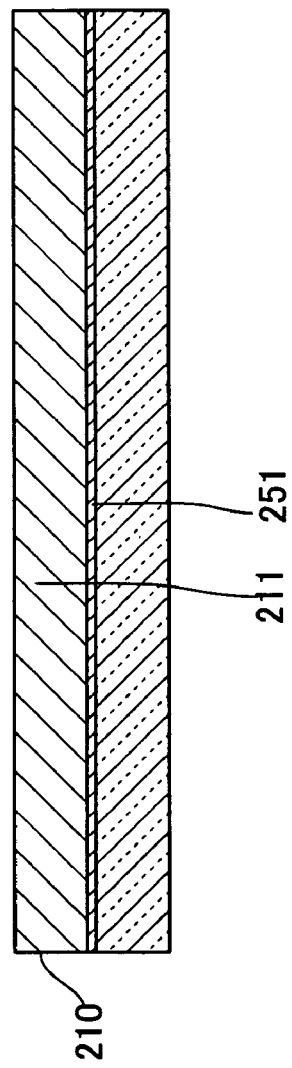
FIG. 22A is a cross-sectional view showing a step after the step depicted in FIGS. 20A and 20B.

<Step to Reach State Shown in FIGS. 22A and 22B>

Then, as shown in FIGS. 22A and 22B, an insulating portion 342 consisting of alumina ($Al_2O_3$) is formed with a thickness of, e.g., approximately 0.5 to 1.0 μm on the entire surface, and the surface of the insulating portion 342 is polished based on, e.g., CMP, so that a height of the main magnetic pole film 211 and a thickness of the insulating portion 342 become approximately 0.2 to 0.25 μm, thereby planarizing the surface.

Here, after performing polishing based on CMP or before performing polishing based on CMP, it is good enough to carry out annealing with respect to at least the surface of the magnetic pole end portion 210 of the main magnetic pole film 211 at 200 to 260° C. By effecting this annealing, the influence of residual magnetization in the magnetic pole end portion 210 after end of a write operation can be reduced. It is to be noted that this annealing may be carried out after forming the later-described recording gap 241.

Subsequently, a film required to form the recording gap 241 is formed with a film thickness of 40 nm to 50 nm so as to cover the entire upper surface of the laminated body. A material of this film may be an insulating material such as alumina or a non-magnetic metallic material such as Ru, NiCu, Ta, W, Cr, $Al_2O_3$, $Si_2O_3$ or the like. Further, this film is selectively etched so that an area on the ABS side remains and a part of the main magnetic pole film 211 on the side apart from the ABS is exposed (here, the exposed part serves as the above-described yoke portion). As a result, the recording gap film 241 is formed.

Figure 23B:
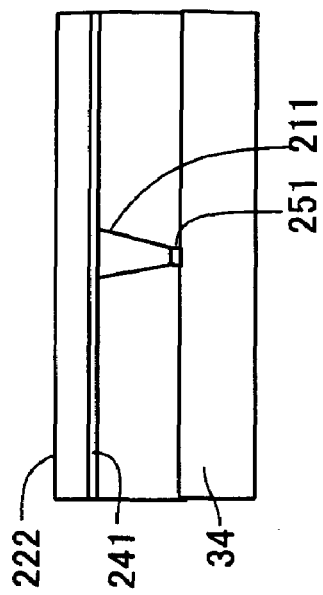
FIG. 23B is a front view showing the state depicted in FIG. 23A from the ABS side.
Figure 23A:
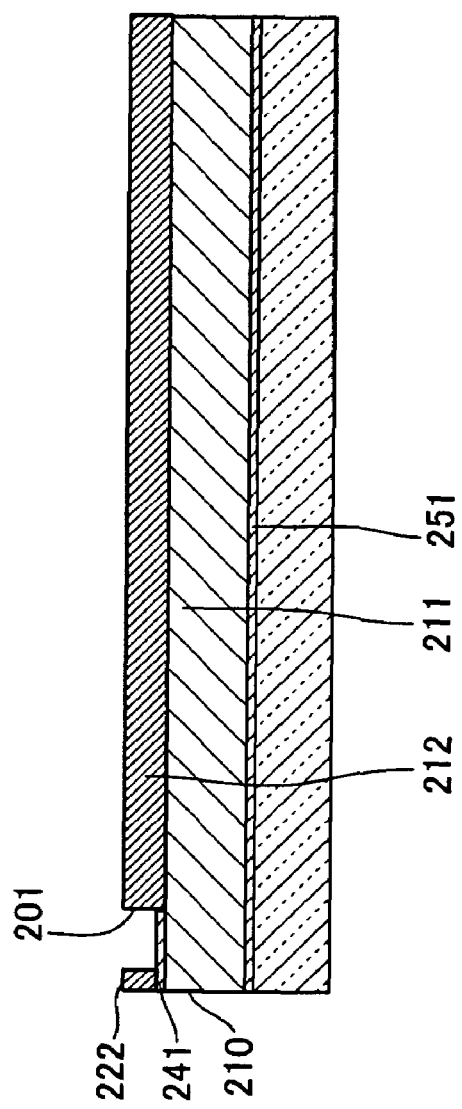
FIG. 23A is a cross-sectional view showing a step after the step depicted in FIGS. 22A and 22B.

<Step to Reach State Shown in FIGS. 23A and 23B>

Then, NiFe having the saturation magnetic flux density of 1.0 to 1.6 T or CoNiFe having the saturation magnetic flux density of 1.9 to 2.1 T, the small magnetostriction λ and the small maximum coercivity Hc is used as a magnetic material, and the upper yoke magnetic pole film 212 and the first write shield portion 222 are formed together with a thickness of approximately 0.3 to 1.0 μm on the entire surface of the laminated body at the same step by a plating method.

The upper yoke magnetic pole film 212 is formed to be bonded to a part of the main magnetic pole film 211 which is not coated with the recording gap film 241, and the first write shield portion 222 is formed to be connected to the ABS side of the recording gap layer 241. Furthermore, the upper yoke magnetic pole film 212 and the first write shield portion 222 are formed in such a manner that their end surfaces have the same height at a subsequent step. Moreover, the first write shield portion 222 is formed at a position where a throat height is determined so as to face the magnetic pole end portion 210 with the recording gap film 241 therebetween in the ABS.

Figure 24B:
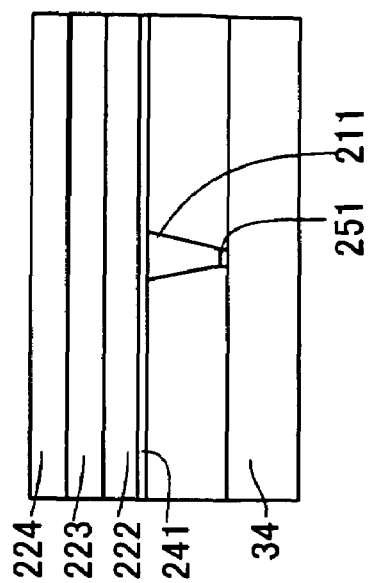
FIG. 24B is a front view showing the state depicted in FIG. 24A from the ABS side.
Figure 24A:
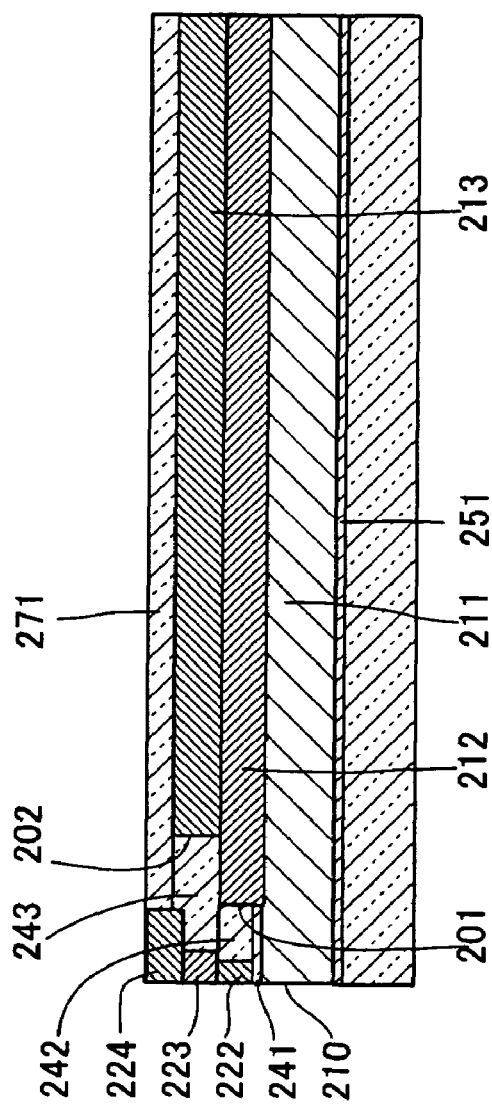
FIG. 24A is a cross-sectional view showing a step after the step depicted in FIGS. 23A and 23B.

<Step to Reach State Shown in FIGS. 24A and 24B>

Then, the insulating film 242 consisting of alumina ($Al_2O_3$) is formed with a thickness of, e.g., 1.0 to 1.5 μm on the entire surface of the laminated body. Additionally, the surfaces of the first write shield portion 222 and the upper yoke magnetic pole film 212 are polished based on CMP so as to have a thickness of approximately 0.3 to 0.8 μm, thereby planarizing the surfaces. By this planarization processing of the surfaces, the first write shield portion 222, the insulating film 242 and the upper yoke magnetic pole film 212 have end surfaces with the same height.

Subsequently, the second upper yoke magnetic pole film 213 and the second write shield portion 223 are formed together on the surfaces planarized as described above at the same step by a plating method. The second upper yoke magnetic pole film 213 is slightly retracted from the end portion of the first upper yoke magnetic pole film 212 and formed to be bonded to the first upper yoke magnetic pole film 212, and the second write shield portion 223 is formed to be bonded to the first write shield portion 222.

Then, the insulating film 243 consisting of alumina ($Al_2O_3$) is formed with a thickness of, e.g., 1.0 to 1.5 μm on the entire surface of the laminated body, and then planarized based on, e.g., CMP so that the second write shield portion 223, the insulating film 243 and the second upper yoke magnetic pole film 213 have end surfaces with the same height.

After performing planarization as described above, at the end portion on the ABS side, the surfaces of the second write shield portion 223 and the insulating film 243 are partially removed by means of, e.g., milling, and the third write shield portion 224 is formed by a plating method. Further, the insulating film 271 is formed at a part where the third write shield portion 224 is not formed by means of a sputtering method or the like. Thereafter, the surfaces of the third write shield portion 224 and the insulating film 271 are planarized by means of, e.g., CMP. FIGS. 24A and 24B show a state after this planarization step is terminated.

Figure 25B:
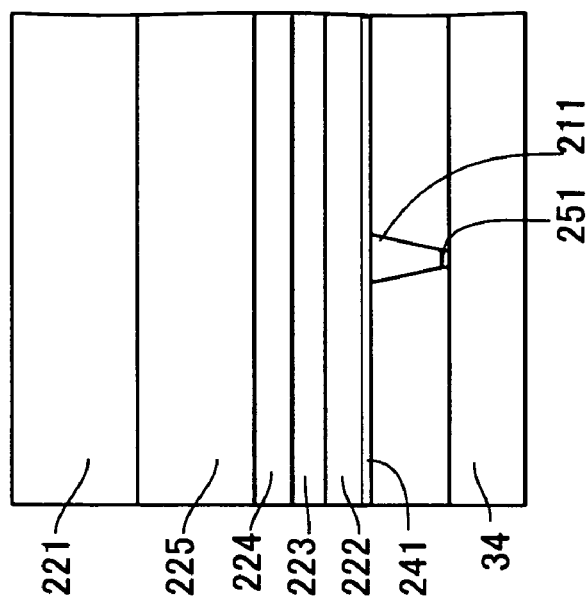
FIG. 25B is a front view showing the state depicted in FIG. 25A from the ABS side.
Figure 25A:
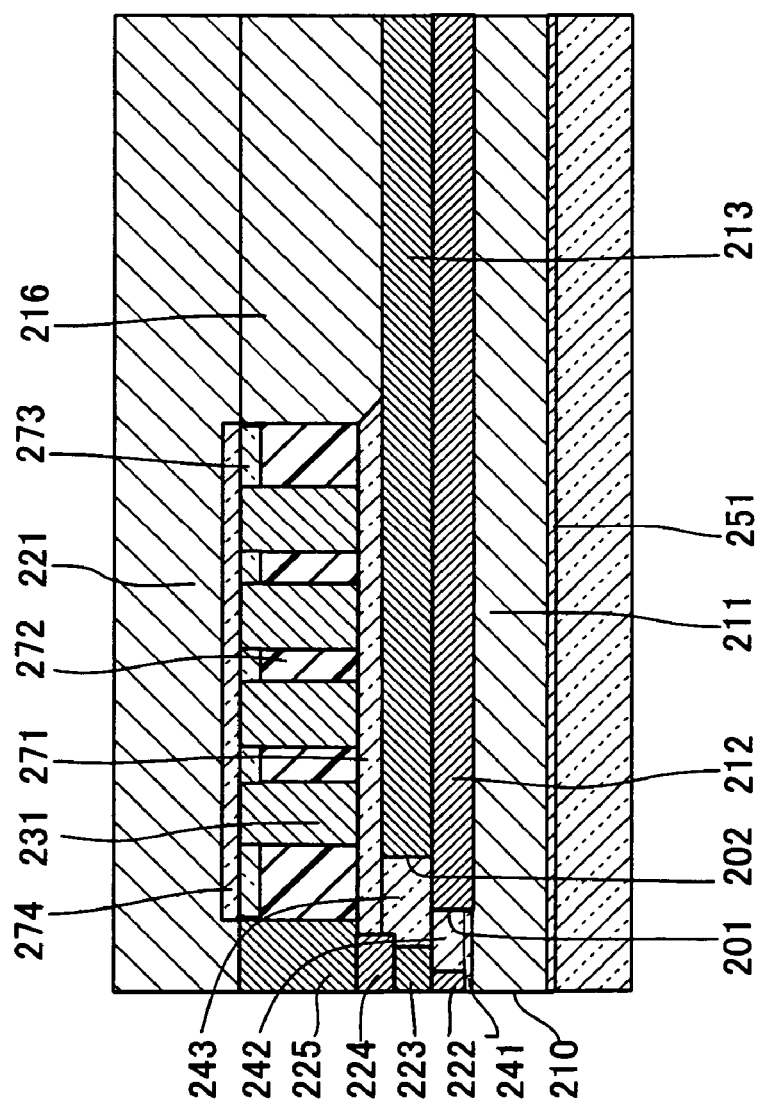
FIG. 25A is a cross-sectional view showing a step after the step depicted in FIGS. 24A and 24B.

<Step to Reach State Shown in FIGS. 25A and 25B>

Then, a frame is formed on the insulating film 271 by using an electrode film (not shown) consisting of an electroconductive material and photolithography, and then electroplating is carried out by using the electrode film, thereby forming a plated layer consisting of Cu. This plated layer and the underlying electrode film serve as the thin film coil 231. The thin film coil 231 is electrically insulated from the upper yoke magnetic pole film 212 by the insulating film 271.

Next, although not shown, a frame is formed by the photolithography, and the fourth write shield portion 225 is then formed by a frame plating method. The fourth write shield portion 225 and the thin film coil 231 may be formed in the reversed order.

Furthermore, a photoresist is applied to cover the entire surface of the laminated body, the insulating film 273 consisting of alumina ($Al_2O_3$) is formed thereon, and then the entire surface is polished based on CMP, thereby planarizing the surface. In this case, the surfaces of thin film coil 231 and the fourth write shield portion 225 are polished based on CMP so as to have a thickness of approximately 2.0 to 2.5 µm.

Subsequently, the insulating film 274 consisting of alumina ($Al_2O_3$) is formed with a thickness of approximately 0.2 µm so as to cover the entire surface of the laminated body, and then the write shield film 221 is formed with a thickness of approximately 2 to 3 µm. FIGS. 25A and 25B show a state after completion of the step of forming the write shield film 221. Thereafter, a protection film is formed by a sputtering method, thereby obtaining the thin film magnetic head depicted in FIGS. 8 to 10.

(3) Manufacturing Method Applicable to Manufacture of Thin Film Magnetic Head Depicted in FIGS. 11A, 11B and 11C to FIGS. 14A and 14B A description will now be given as to a manufacturing method applicable to manufacture of the thin film magnetic head depicted in FIGS. 11A, 11B and 11C to FIGS. 14A and 14B with reference to FIGS. 26A and 26B to FIGS. 31A and 31B.

Figure 26B:
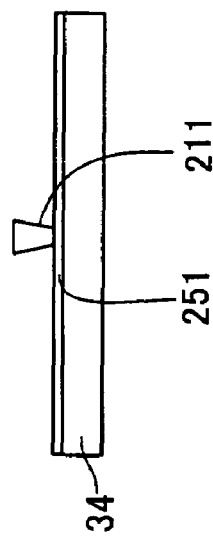
FIG. 26B is a front view showing the state depicted in FIG. 26A from the ABS side.
Figure 26A:
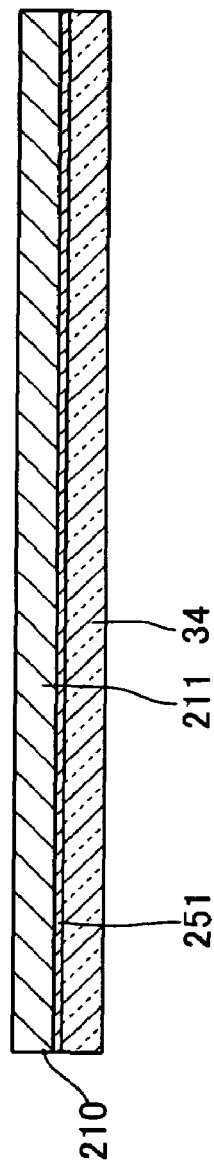
FIG. 26A is a cross-sectional view showing still another method of manufacturing the thin film magnetic head according to the present invention.

<Step to Reach State Shown in FIGS. 26A and 26B>

First, FIGS. 26A and 26B show a state in which a plated electrode film 252 and the main magnetic pole film 211 are formed on the insulating film 34. The main magnetic pole film 211 is formed by plating a magnetic material of CoFe or CoNiFe having a thickness of approximately 0.6 to 0.8 µm and the high saturation magnetic flux density of 2.3 T to 2.4 T so that the magnetic pole end portion 210 is provided on the ABS side.

Figure 27B:
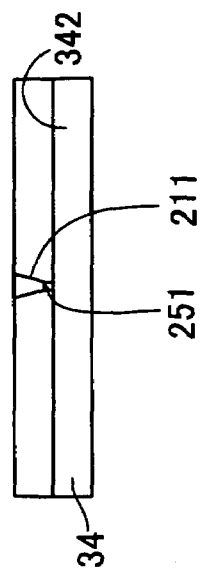
FIG. 27B is a front view showing the state depicted in FIG. 27A from the ABS side.
Figure 27A:
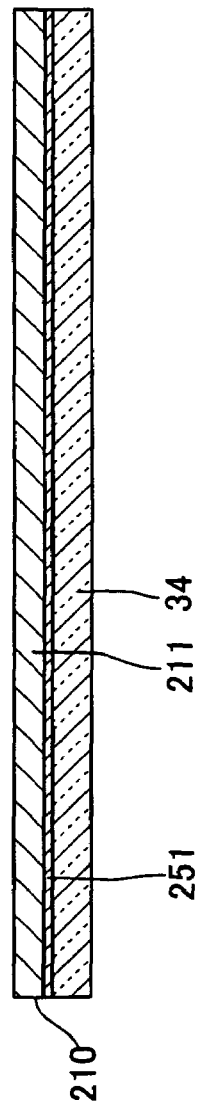
FIG. 27A is a cross-sectional view showing a step after the step depicted in FIGS. 26A and 26B.

<Step to Reach State Shown in FIGS. 27A and 27B>

Then, after patterning the plated electrode film 252, as shown in FIGS. 27A and 27B, the insulating portion 342 consisting of alumina ($Al_2O_3$) is formed with a thickness of, e.g., 0.5 to 1.0 µm on the entire surface, and the surface of the main magnetic pole film 211 is polished by, e.g., CMP in such a manner that the main magnetic pole film 211 has a height of approximately 0.2 to 0.25 µm, thereby planarizing the surface.

<Step to Reach State Shown in FIGS. 28A and 28B>

Subsequently, a film required to form the recording gap film 241 is formed with a film thickness of 40 nm to 50 nm so as to cover the entire upper surface of the laminated body. Then, this film is selectively etched in such a manner that an area on the ABS side remains and a part of the main magnetic pole film 211 on the side apart from the ABS is exposed. As a result, the recording gap film 241 is formed.

Then, the upper yoke magnetic pole film 212 and the first write shield portion 222 are formed together with a thickness of approximately 0.3 to 1.0 µm on the entire surface of the laminated body in the same step by using as a magnetic material NiFe having the saturation magnetic flux density of 1.0 to 1.6 T or CoNiFe having the saturation magnetic flux density of 1.9 to 2.1 T, the small magnetostriction λ and the small maximum coercivity Hc by a plating method.

The upper yoke magnetic pole film 212 is formed so as to be bonded at a part of the main magnetic pole film 211 which is not coated with the recording gap film 241, and the first write shield portion 222 is formed to be connected to the ABS side of the recording gap layer 241. Additionally, the upper yoke magnetic pole film 212 and the first write shield portion 222 are formed so that their end surfaces have the same height at a subsequent step. Further, the first write shield portion 222 is formed at a position where a throat height is determined so as to face the magnetic pole end portion 210 with the recording gap film 241 therebetween in the ABS.

The upper yoke magnetic pole film 212 is subjected to dry etching based on, e.g., RIE or IBE in such a manner that an inclined surface 201 is formed at a leading end portion thereof, i.e., an end portion facing the first write shield portion 222.

Figures 29A, 29B:
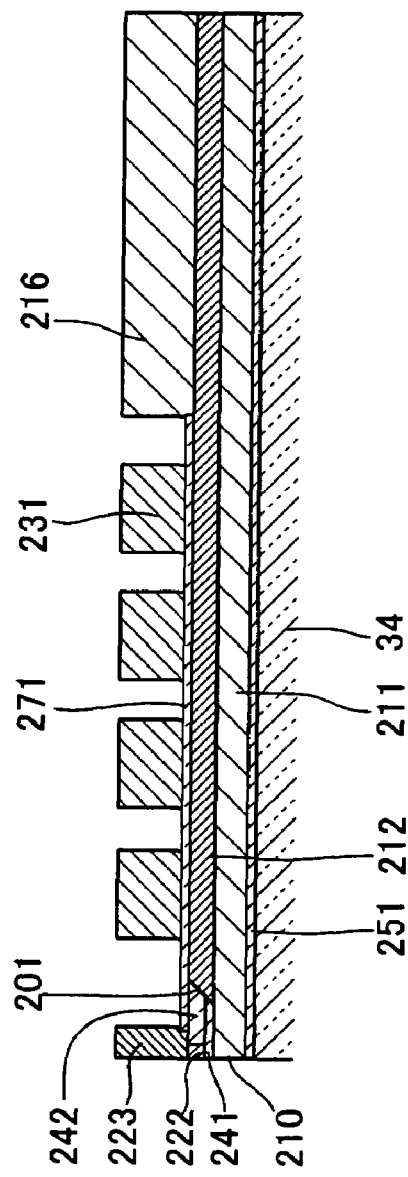
FIG. 29A is a cross-sectional view showing a step after the step depicted in FIGS. 28A and 28B.
FIG. 29B is a front view showing the state depicted in FIG. 29A from the ABS side.

<Step to Reach State Shown in FIGS. 29A and 29B>

Then, the insulating film 242 consisting of alumina ($Al_2O_3$) is formed with a thickness of, e.g., 1.0 to 1.5 µm on the entire surface of the laminated body. Furthermore, the surfaces of the first write shield portion 222 and the upper yoke magnetic pole film 212 are polished based on CMP in such a manner that their thickness becomes approximately 0.3 to 0.8 µm, thereby planarizing the surfaces. By this planarization processing of the surfaces, the first write shield portion 222, the insulating film 242 and the upper yoke magnetic pole film 212 have end surfaces with the same height.

Subsequently, the insulating film 271 consisting of alumina ($Al_2O_3$) is formed with a thickness of approximately 0.2 µm on the entire surface of the laminated body, and an opening portion is provided at a position where the second write shield portion 223 should be formed. As a result, there can be obtained the insulating film 271 which insulates the thin film coil 231 and the upper yoke magnetic pole film 212 from each other so as not to be short-circuited.

Then, a frame is formed on the insulating film 271 by using an electrode film (not shown) consisting of an electroconductive material and photolithography, and electroplating using the electrode film is then carried out, thereby forming a plated layer consisting of Cu. This plated layer and the underlying electrode film serve as the thin film coil 231. The thin film coil 231 is electrically insulated from the upper yoke magnetic pole film 212 by the insulating film 271.

Then, although not shown, a frame is formed by the photolithography, and then the second write shield portion 223 is formed by a frame plating method. The same magnetic material as that of the first write shield portion 222 is used for the second write shield portion 223. It is to be noted that this second write shield portion 223 and the thin film coil 231 may be formed in the reversed order.

Figures 30A, 30B:
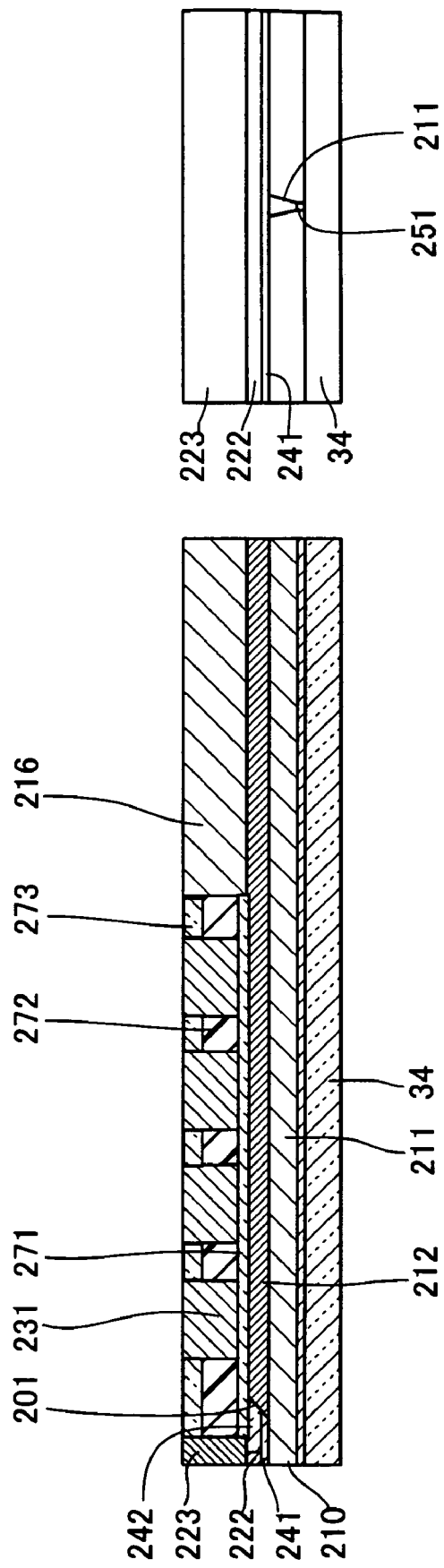
FIG. 30A is a cross-sectional view showing a step after the step depicted in FIGS. 29A and 29B.
FIG. 30B is a front view showing the state depicted in FIG. 30A from the ABS side.

<Step to Reach State Shown in FIGS. 30A and 30B>

Moreover, a photoresist is applied to cover the entire surface of the laminated body, and an insulating film consisting of alumina ($Al_2O_3$) is formed on the photoresist, and the entire surface is polished based on CMP, thereby planarizing the surface. In this case, the surfaces of the thin film coil 231 and the second write shield portion 223 are polished based on CMP so that they have a thickness of approximately 2.0 to 2.5 μm.

Figures 31A, 31B:
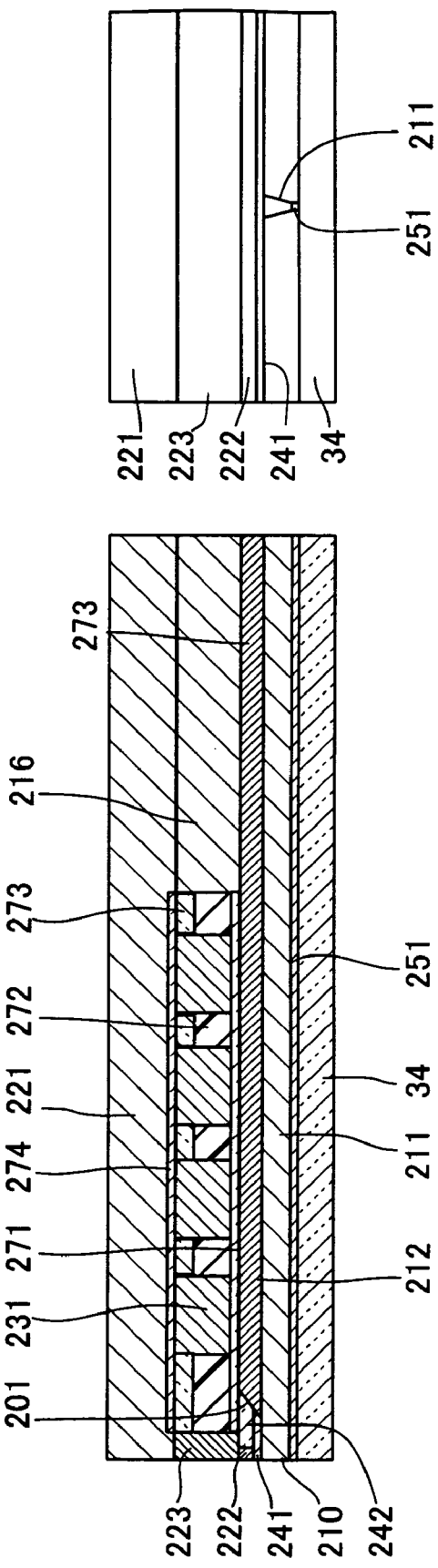
FIG. 31A is a cross-sectional view showing a step after the step depicted in FIGS. 30A and 30B.
FIG. 31B is a front view showing the state depicted in FIG. 31A from the ABS side.

<Step to Reach State Shown in FIGS. 31A and 31B>

Subsequently, the insulating film 273 consisting of alumina ($Al_2O_3$) is formed with a thickness of approximately 0.2 μm to cover the entire surface of the laminated body, and then an opening portion is provided at a position where the second write shield portion 223 is formed. As a result, there can be obtained the insulating film 273 which insulates the thin film coil 231 and the third write shield portion 224 from each other so as not to be short-circuited. Then, the write shield film 221 is formed with a thickness of approximately 2 to 3 μm. Thereafter, a protection film is formed by a sputtering method.

3. Magnetic Head Apparatus and Magnetic Recording/Reproducing Apparatus

Figure 32:
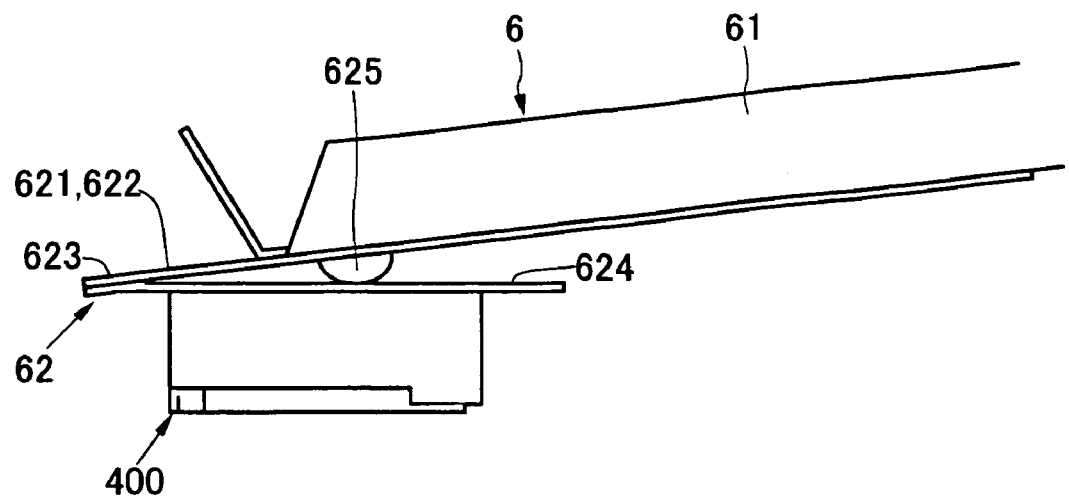
FIG. 32 is a front view of a magnetic head apparatus using the thin film magnetic head according to the present invention.
Figure 33:
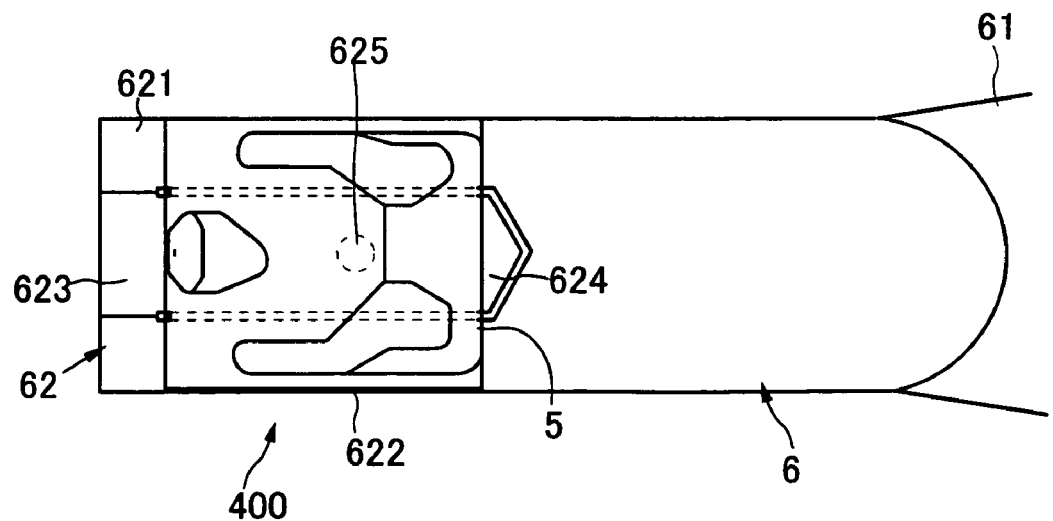
FIG. 33 is a bottom view of the magnetic head apparatus depicted in FIG. 32.

The present invention also discloses a magnetic head apparatus and a magnetic recording/reproducing apparatus. Referring to FIGS. 32 and 33, the magnetic head apparatus (a head gimbal assembly, a head stack assembly or the like) according to the present invention includes a thin film magnetic head 400 shown in FIGS. 1 to 14 and a head support device 6. The head support device 6 has a configuration in which a flexible body 62 formed of a sheet metal is attached at a free end provided at one end of a support body 61 likewise formed of a sheet metal in the longitudinal direction and the thin film magnetic head 400 is attached to the lower surface of this flexible body 62.

Specifically, the flexible body 62 has two outer frame portions 621 and 622 which extend substantially in parallel with the longitudinal axial line of the support body 61, a lateral frame 623 which couples the outer frame portions 621 and 622 at an end apart from the support body 61, and a tongue-like piece 624 which extends from a substantially central part of the lateral frame 623 in substantially parallel with the outer frame portions 621 and 622 and has an end as a free end. One end on the side opposite to a direction along which the lateral frame 623 is provided is attached in the vicinity of the free end of the support body 61 by means of welding or the like.

For example, a semispherical load protrusion 625 is provided on the lower surface of the support body 61. This load protrusion 625 transmits a load force from the free end of the support body 61 to the tongue-like piece 624.

The thin film magnetic head 400 is attached on the lower surface of the tongue-like piece 624 by means of an adhesive or the like. The thin film magnetic head 400 is supported to allow a pitch operation and a rolling operation.

The head support device 6 which can be applied to the present invention is not restricted to the foregoing embodiment, and a head support device which has been already proposed or will be proposed can be extensively applied. For example, it is possible to use a head support device in which the support body 61 and the tongue-like piece 624 are integrally formed by using a flexible polymeric wiring board such as a tab tape (TAB). Further, a device having a conventionally known gimbal configuration can be used without restraint.

Figure 34:
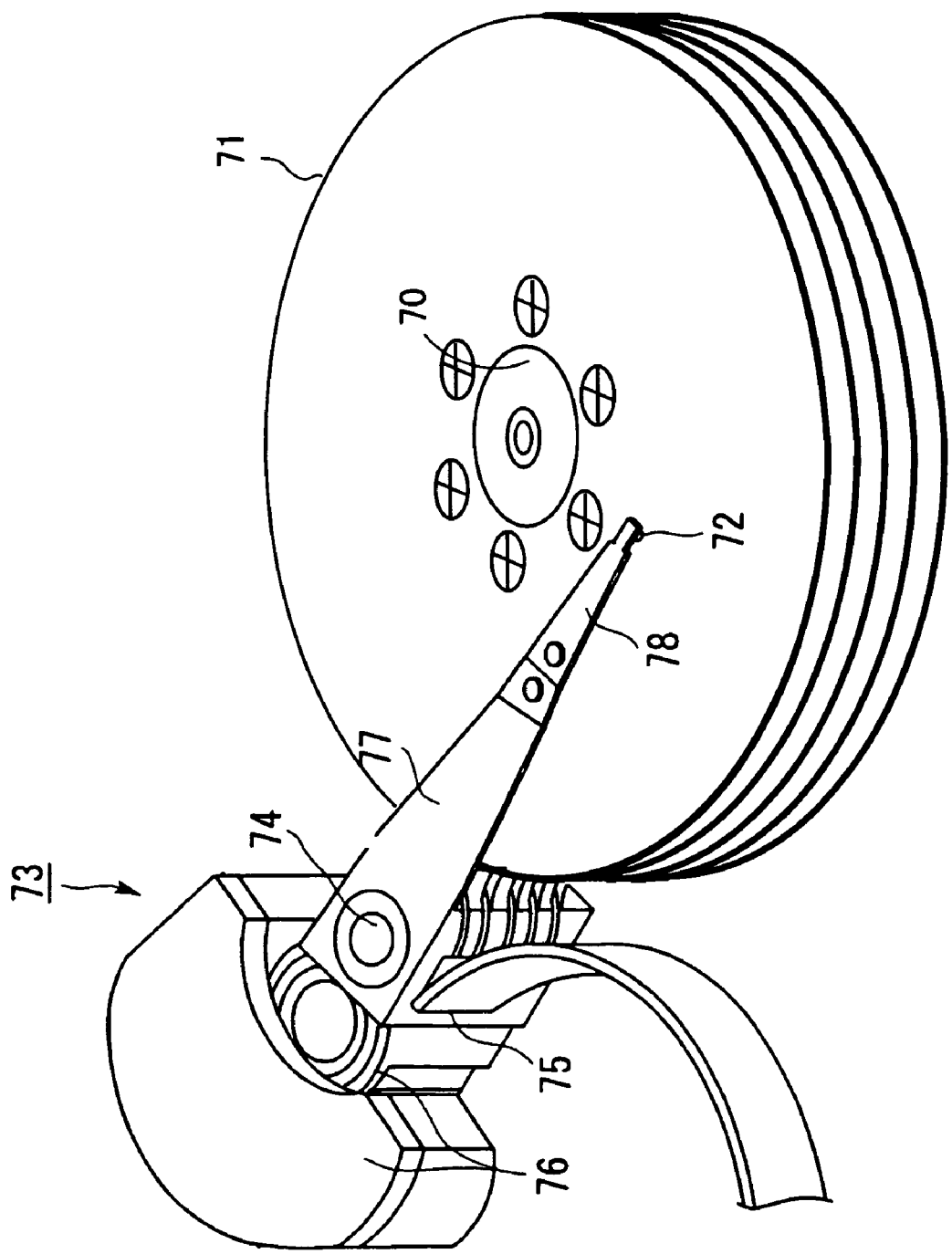
FIG. 34 is a view showing a magnetic disk apparatus using the magnetic head apparatus depicted in FIGS. 32 and 33.

Referring to FIG. 34, the magnetic recording/reproducing apparatus according to the present invention comprises a magnetic disk 71 provided rotatably around a shaft 70, a thin film magnetic head 72 which records and reproduces information with respect to the magnetic disk 71, and an assembly carriage device 73 which positions the thin film magnetic head 72 on a track of the magnetic disk 71.

The assembly carriage device 73 is mainly constituted of a carriage 75 which can swivel around a shaft 74 and an actuator 76 which drives this carriage 75 to swivel and is formed of, e.g., a voice coil motor (VCM).

Base portions of a plurality of drive arms 77 stacked in a direction of the shaft 74 are attached to the carriage 75, and a head suspension assembly 78 having the thin film magnetic head 72 mounted therein is secured at an end portion of each drive arm 77. Each head suspension assembly 78 is provided at the end portion of the drive arm 77 in such a manner that the thin film magnetic head 72 provided at the end portion thereof faces the surface of each magnetic disk 71.

The drive arm 77, the head suspension assembly 78 and the thin film magnetic head 72 constitute the magnetic head apparatus described in conjunction with FIGS. 32 and 33. The thin film magnetic head 72 has the configuration shown in FIGS. 1 to 14. Therefore, the magnetic recording/reproducing apparatus depicted in FIG. 34 demonstrates the effects and advantages described with reference to FIGS. 1 to 14.

While the present invention has been particularly shown and described with reference to preferred embodiments thereof, it will be understood by those skilled in the art that various changes in form and detail may be made therein without departing from the spirit, scope and teaching of the invention.

What is claimed is:

1. A thin film magnetic head comprising: a main magnetic pole film; a write shield film; an upper yoke magnetic pole film; and a thin film coil, wherein the main magnetic pole film has a magnetic pole end portion on a medium opposing surface side which should face a magnetic disk, the write shield film faces the magnetic pole end portion so as to form a recording gap film on the medium opposing surface side, the upper yoke magnetic pole film is provided on the side of the main magnetic pole film close to the write shield film, and the end portion of the upper yoke magnetic pole on the medium opposing surface side is retracted in a direction apart from the medium opposing surface in accordance with an increase in film thickness which is measured from the surface of the main magnetic pole film, the thin film coil supplies a magnetic flux passing through the main magnetic pole film, the write shield film and the upper yoke magnetic pole film, the write shield film comprises a first write shield portion and a second write shield portion, the first write shield portion faces the magnetic pole end portion of the main magnetic pole film with the recording gap film therebetween in the medium opposing surface, and is formed so that a throat height is determined based on the depth in a direction crossing the medium opposing surface, and has an end surface formed to have the same height as that of the end surface of the upper yoke magnetic pole film on the side close to the thin film coil, and the second write shield portion is connected with the end surface of the first write shield portion.

2. The thin film magnetic head according to claim 1, wherein the upper yoke magnetic pole film has the end portion formed as an inclined surface.

3. The thin film magnetic head according to claim 1, wherein a plurality of upper yoke magnetic pole films are sequentially provided, and the end portions of the respective upper yoke magnetic pole films are sequentially retracted in a direction apart from the medium opposing surface.

4. The thin film magnetic head according to claim 1, wherein the main magnetic pole film and the upper yoke magnetic pole film are formed of magnetic materials having different saturation magnetic flux densities, and the saturation magnetic flux density of the main magnetic pole film is set higher than the saturation magnetic flux density of the upper yoke magnetic pole film.

5. The thin film magnetic head according to claim 1, further comprising a high-tension film which is in contact with the main magnetic pole film and consists of Ta, W, Mo, TiW, TiN, Cr, NiCr, Mo, Ru or SiN.

6. The thin film magnetic head according to claim 1, wherein a shield end portion of the write shield film and the main magnetic pole film are formed of magnetic materials having different saturation magnetic flux densities, and the saturation magnetic flux density of the shield end portion is set lower than the saturation magnetic flux density of the main magnetic pole film.

7. The thin film magnetic head according to claim 1, further comprising a read element.

8. The thin film magnetic head according to claim 7, wherein the read element comprises a GMR element or a ferromagnetic tunnel junction film.

9. A magnetic head apparatus comprising: a thin film magnetic head; and a gimbal,
wherein the thin film magnetic head comprises a main magnetic pole film, a write shield film, an upper yoke magnetic pole film, and a thin film coil,
the main magnetic pole film has a magnetic pole end portion on a medium opposing surface side which should face a magnetic disk,
the write shield film faces the magnetic pole end portion so as to form a recording gap film on the medium opposing surface side,
the upper yoke magnetic pole film is provided on the side of the main magnetic pole film close to the write shield film, and the end portion of the upper yoke magnetic pole on the medium opposing surface side is retracted in a direction apart from the medium opposing surface in accordance with an increase in film thickness which is measured from the surface of the main magnetic pole film,
the thin film coil supplies a magnetic flux passing through the main magnetic pole film, the write shield film and the upper yoke magnetic pole film,
the gimbal supports the thin film magnetic head,
the write shield film comprises a first write shield portion and a second write shield portion,
the first write shield portion faces the magnetic pole end portion of the main magnetic pole film with the recording gap film therebetween in the medium opposing surface, and is formed so that a throat height is determined based on the depth in a direction crossing the medium opposing surface, and has an end surface formed to have the same height as that of the end surface of the upper yoke magnetic pole film on the side close to the thin film coil, and
the second write shield portion is connected with the end surface of the first write shield portion.

10. The magnetic head apparatus according to claim 9, wherein the upper yoke magnetic pole film has the end portion formed as an inclined surface.

11. The magnetic head apparatus according to claim 9, wherein a plurality of upper yoke magnetic pole films are sequentially provided, and the end portions of the respective upper yoke magnetic pole films are sequentially retracted in a direction apart from the medium opposing surface.

12. A magnetic disk apparatus comprising: a magnetic head apparatus; and a magnetic disk,
wherein the magnetic head apparatus supports a thin film magnetic head by a gimbal and causes the thin film magnetic head to face the magnetic disk,
the thin film magnetic head comprises a main magnetic pole film, a write shield film, an upper yoke magnetic pole film, and a thin film coil,
the main magnetic pole film has a magnetic pole end portion on a medium opposing surface side which should face the magnetic disk;
the write shield film faces the magnetic pole end portion so as to form a recording gap film on the medium opposing surface side,
the upper yoke magnetic pole film is provided on the side of the main magnetic pole film close to the write shield film, and the end portion of the upper yoke magnetic pole on the medium opposing surface side is retracted in a direction apart from the medium opposing surface in accordance with an increase in film thickness which is measured from the surface of the main magnetic pole film,
the thin film coil supplies a magnetic flux passing through the main magnetic pole film, the write shield film and the upper yoke magnetic pole film,
the write shield film comprises a first write shield portion and a second write shield portion,
the first write shield portion faces the magnetic pole end portion of the main magnetic pole film with the recording gap film therebetween in the medium opposing surface, and is formed so that a throat height is determined based on the depth in a direction crossing the medium opposing surface, and has an end surface formed to have the same height as that of the end surface of the upper yoke magnetic pole film on the side close to the thin film coil, and
the second write shield portion is connected with the end surface of the first write shield portion.

13. The magnetic disk apparatus according to claim 12, wherein the upper yoke magnetic pole film has the end portion formed as an inclined surface.

14. The magnetic disk apparatus according to claim 12, wherein the a plurality of upper yoke magnetic pole films are sequentially provided, and the end portions of the respective upper yoke magnetic pole films are sequentially retracted in a direction apart from the medium opposing surface.

* * * * *